United States Patent [19]

Mirand et al.

[11] Patent Number: 5,397,144
[45] Date of Patent: Mar. 14, 1995

[54] BICYCLE OPERATED AIR PUMP

[75] Inventors: Mauricio Mirand, Lakewood, Calif.;
Robert Brown, Jamestown, N. Dak.;
Jeffrey C. Brown, Seattle, Wash.;
Buford H. Hopper, Bothell, Wash.;
Harry G. Worth, Seattle, Wash.

[73] Assignee: Velo Research, Inc., Lynnwood, Wash.

[21] Appl. No.: 169,424

[22] Filed: Feb. 28, 1994

Related U.S. Application Data

[63] Continuation-in-part of Ser. No. 808,049, Dec. 12, 1991, Pat. No. 5,318,317, which is a continuation of Ser. No. 518,986, May 4, 1990, abandoned.

[51] Int. Cl.⁶ ............................................. B62J 11/02
[52] U.S. Cl. ................................. 280/201; 417/233; 152/416; 24/528
[58] Field of Search ................ 417/231, 233, 235, 534, 417/535, 536, 537, 63; 280/201; 152/415, 416; 92/6; 24/527, 528

[56] References Cited

U.S. PATENT DOCUMENTS

| | | |
|---|---|---|
| 540,252 | 6/1895 | Harding . |
| 559,418 | 5/1896 | Spencer . |
| 596,223 | 12/1897 | Wickersham et al. . |
| 624,417 | 5/1899 | Wickersham et al. . |
| 652,997 | 7/1900 | Crandall . |
| 681,565 | 8/1901 | McCune et al. . |
| 744,483 | 11/1903 | Carlberg . |
| 797,447 | 8/1905 | Merry . |
| 868,658 | 10/1907 | Hamacher . |
| 1,169,705 | 1/1916 | Wilkes . |
| 1,349,225 | 8/1920 | Roseblum . |
| 1,455,646 | 5/1923 | Millard . |
| 1,760,346 | 5/1930 | Correa . |
| 2,472,647 | 6/1949 | Covins . |
| 2,662,261 | 12/1953 | Mikoski . |
| 3,053,194 | 9/1962 | Webster . |
| 3,233,554 | 2/1966 | Huber et al. . |
| 3,283,997 | 11/1966 | Bambenek et al. . |
| 3,451,276 | 6/1969 | Wadlow et al. . |
| 3,510,923 | 5/1970 | Blake . |
| 3,517,652 | 6/1970 | Albertson . |
| 4,137,020 | 1/1979 | Ito et al. . |
| 4,462,768 | 7/1984 | Westmoreland . |
| 4,677,328 | 6/1987 | Kumakura . |
| 5,318,317 | 6/1994 | Hopper ............................. 280/201 |

FOREIGN PATENT DOCUMENTS

| | | |
|---|---|---|
| 33040/71 | 3/1973 | Australia . |
| 480975 | 12/1949 | Belgium . |
| 893307 | 10/1953 | Germany . |
| 3839076 | 1/1989 | Germany . |
| 248366 | 2/1948 | Switzerland . |
| 724960 | 2/1955 | United Kingdom . |

*Primary Examiner*—Timothy S. Thorpe
*Attorney, Agent, or Firm*—Ronald M. Anderson

[57] ABSTRACT

An air pump for use with a chain-driven bicycle having a free wheel. The pump assembly comprises a pair of opposed cylinders and a double-ended piston rod mounted in a housing. The piston rod has a bearing slot, which engages a crank pin on a crankshaft driven by a sprocket. Rotation of the sprocket reciprocates the double-ended piston rod in the cylinders. The cylinders are each integrally formed with a manifold that uses an elastomeric band covering a passage from the cylinder interior to inside the manifold as a one-way valve. An enlarged diameter skirt on each cylinder allows air to enter the cylinder on each intake stroke. A cap defining the piston head is locked onto each piston and holds a seal in place on the piston. An integral clamp assembly allows the pump to be removably mounted on a bicycle chain stay. The lower run of the bicycle drive chain engages the drive sprocket of the pump assembly, and a chain retainer is used to maintain the engagement of the drive chain with the drive sprocket. Reverse rotation of the bicycle's crank assembly causes the conventional free wheel to also rotate in a reverse direction without rotating the wheel of the bicycle. The resulting movement of the chain over the drive sprocket of the pump rotates the drive sprocket, which reciprocates the double-ended piston rod in the cylinders, and pumps air to an article to be inflated, such as the bicycle tire(s).

32 Claims, 14 Drawing Sheets

BICYCLE OPERATED AIR PUMP

CROSS REFERENCE TO RELATED APPLICATION

This application is a continuation-in-part application of application, Ser. No. 808,049, filed Dec. 12, 1991, now U.S. Pat. No. 5,318,317, which is a continuation of abandoned application Ser. No. 513,986, filed May 4, 1990.

FIELD OF THE INVENTION

The present invention relates generally to air pumps, and more particularly, to an air pump that is operated by the drive chain of a bicycle.

BACKGROUND OF THE INVENTION

Air pumps have long been employed to inflate various articles, such as pneumatic tires, air mattresses, footballs and basketballs, inflatable toys, and the like. By their very nature, many of these articles need to be inflated in field environments, far from service stations or other facilities having installed air compressors. Consequently, a great many types of portable air pumps have been used or proposed, with varying degrees of success.

Perhaps the best known example of a portable air pump is the hand-operated reciprocating type, which is frequently carried clipped to the frame tubes of a bicycle. These pumps typically have a single-acting piston and cylinder, the piston being operated by means of a long rod to which a handle is attached. The cylinder and handle are gripped in opposite hands and reciprocated back and forth to drive air out of the cylinder and into the article to be inflated. While these prior art hand-operated reciprocating air pumps have the advantage of simplicity, they also exhibit a number of shortcomings. Firstly, they are fairly slow to operate, the speed of the reciprocating action being limited to that with which the operator can move his hands back and forth relative to one another. This disadvantage becomes quite burdensome when inflating relatively large articles which require significant volumes of air. Furthermore, inasmuch as the handle directly operates the piston rod, these pumps provide no mechanical advantage to assist the operator; consequently, it can be very difficult to attain high air pressures (as required by many modern bicycle tires) using such pumps. Moreover, since such pumps typically employ pistons and cylinders having small diameters and very long strokes, they are ordinarily quite long and thus difficult to stow. The long cylinders and piston rods are also typically made of metal, rendering it difficult to make such pumps as light as may be desired.

The need for portable air pumps that are compact, light, and fast acting has become more pronounced in recent years, particularly with the advent of very lightweight racing and touring bicycles. For example, speed of operation and minimum weight can be crucial factors in various competitive events, such as triathlons, which involve the use of bicycles.

A number of attempts have been made to employ the drive system or motion of the bicycle itself to operate an air pump. For the most part, these pumps have been mounted to turn with the wheel of the vehicle so as to inflate the tire while the vehicle is in motion. For example, U.S. Pat. No. 1,169,705 to Wilkes (1916) shows a pumping apparatus having a pump cylinder, with a piston being positioned in the cylinder and driven by a piston rod. This assembly is mounted to the hub of the wheel of a motorcycle and rotates therewith. There is a linkage having a roller that extends out through the spokes of the wheel so as to be activated by a track, which is fixed to the frame of the vehicle, causing the piston rod and piston to reciprocate so as to pump air through a flexible hose into the tire on the wheel.

A variety of other air pumps have been proposed, which, like that of Wilkes, are mounted to the hub of a wheel so as to rotate therewith and pump air to a tire on the wheel. For example, U.S. Pat. No. 797,447 to Merry (1905) shows a rotating, hub-mounted piston assembly that engages a slanted disc on the frame of the bicycle so as to impart a reciprocating motion to the piston. U.S. Pat. No. 744,483 to Carlberg (1903) shows a pump assembly that rotates with the wheel and which has a lever that extends from the wheel and cooperates with a fixed cam plate on the bicycle frame so as to reciprocate the cylinder along a wire guide, which is fixed to the wheel rim. U.S. Pat. No. 652,997 to Crandall (1900) shows a pump assembly that rotates with the wheel of a bicycle and has a protruding cam follower, which engages an eccentric cam mounted to the bicycle frame so as to impart a reciprocating motion to a piston in the pump cylinder. U.S. Pat. No. 624,417 to Wickersham et at. (1899), U.S. Pat. No. 596,223 to Wickersham et al. (1897), and U.S. Pat. No. 559,418 to Spencer (1896) show other air pump arrangements having pinion gears that protrude from the rotating pump assemblies and engage larger stationary gears, which are mounted to the vehicle frames; rotation of the pinion gears operates crank arms, which in turn reciprocate pistons of the pumps.

A variety of other devices have been proposed which are driven by the chain and sprocket drive of a bicycle, or which otherwise utilize the rotational motion of bicycle components. For example, U.S. Pat. No. 681,565 to McCune (1901) shows a fan which is mourned adjacent to the handlebars of a bicycle, the blades of which are rotated by means of a belt drive from the crank assembly of the bicycle. U.S. Pat. No. 868,658 to Hamacher (1907) discloses a bicycle in which movement of the rider's feet apparently reciprocates pump cylinders to generate compressed air that acts against vanes of a drum to cause rotation of a shaft, which is presumably attached to a drive for the back wheel. U.S. Pat. No. 3,283,997 to Bambenek et al. discloses a portable ventilator in which a stationary bicycle has a chain and sprocket drive, which rotates a large pulley, which in turn drives a belt that provides power to the ventilating apparatus. U.S. Pat. No. 4,677,328 to Kumakura discloses a bicycle generator having a stator which is fixed to the bicycle frame land a rotor, which rotates with the flange of the wheel.

It will be appreciated that each of the above-described bicycle-driven devices adds undesirable weight to the bicycle to which it is mounted. Furthermore, notably with respect to the air pumps, many of these devices are characterized by complicated, heavy, and inefficient mechanical linkages. The rotating pump assemblies would also have a deleterious effect on the balance of the wheels to which they are affixed. Furthermore, inasmuch as these devices operate while the vehicle is in motion, they would appear to be able to inflate only that tire which rotates on the wheel together with the pump; these devices are thus unsuitable for inflating the other tire of the bicycle, or for inflating articles which are separate from the bicycle, such as air mattresses, footballs, or the like.

A number of air pumps are known apart from those which are bicycle driven. Amongst these is that shown in U.S. Pat. No. 2,472,647 to Coyins (1949), which discloses a double-acting reciprocating pump in which there are two pistons having an interconnecting element. The interconnecting element has a slot which extends at right angles to the direction of reciprocation of the pistons, and which is also at right angles to the axis of a crank. An end portion of the crank arm is received in the slot and as the crank arm rotates, the interconnected pistons are moved back and forth for the pumping action. There are inlet and outlet valves for each cylinder, the outlet valves being able to be connected to a common output line so as to obtain a more or less constant flow of air from the pump. Similar piston-cylinder arrangements are shown in U.S. Pat. No. 3,517,652 to Albertson (1970), which discloses a two-stroke engine, and U.S. Pat. No. 3,451,276 to Wadlow et al. (1969), which discloses an actuator mechanism. None of the devices described in this paragraph is adapted for use with a bicycle-drive mechanism.

U.K. Patent No. 724,960 to Mehta (1955) does disclose a single-piston reciprocating air pump adapted for use with a bicycle drive mechanism. The air pump is attached to the frame of the bicycle, at a location above the drive chain. A pivotable mechanical linkage extends downwardly from the air pump towards the drive chain of the bicycle, and a sprocket disposed on the distal end of the mechanical linkage engages the drive chain. Engagement of the sprocket with the drive chain is maintained by a clamp attached to the sprocket and to the frame of the bicycle at a location below the upper run of the bicycle chain. Wing nuts permit the clamp to be loosened, and reclamped to the frame of the bicycle at a location that disengages the sprocket from the drive chain when it is not desired to operate the air pump.

However, the air pump disclosed by Mehta has numerous problems because it is so complicated and inefficient that it likely will not work reasonably well for its intended purpose. First, the mechanical linkage is of substantial length having two pivot points. The substantial length of the linkage results in a large lever arm that causes relatively large forces and torques to be applied to the air pump. Thus, the only material of which the air pump can be made that can structurally withstand the relatively large forces and torques is metal, which undesirably adds significant weight to the bicycle.

Second, the substantial length of the mechanical linkage requires precise longitudinal alignment of the air pump on the bicycle frame, which is difficult to achieve with a device clamped to the frame of a bicycle. Moreover, any shocks applied to the bicycle, which are common, will require precisely re-aligning the device of Mehta on the bicycle.

Third, the mechanical linkage is exposed to the environment, which probably will result in corrosion of the metal linkage, buildup of contaminants on the pivot points of the linkage, and introduction of contaminants into the pumping assembly.

Fourth, the air pump includes a single reciprocating piston, which is inefficient compared to a doubly-opposed piston arrangement. Unfortunately, with the arrangement disclosed by Mehta, there is no reasonable way that a doubly-opposed piston arrangement could be used.

Finally, the sprocket is designed to be disengaged from the drive chain by loosening wing-nuts that tighten the clamp mounted to the bicycle frame. The problem here, however, is that is very difficult to re-engage the sprocket with the drive chain when desired because the sprocket must be tightly held against the drive chain while tightening the wing-nuts.

Accordingly, there is a need for a portable air pump for inflating bicycle tires and other articles, which is light in weight, efficient and fast in operation, and usable on bicycles having chain tensioning derailleurs. Furthermore, there is a need for such a device which provides a mechanical advantage so as to permit an operator to inflate articles to high pressures, as well as for such a device which is compact and readily stowable.

SUMMARY OF THE INVENTION

The present invention has solved the problems cited above, and provides a method for pumping air using a bicycle. As with most bicycles, the bicycle has a frame, a crank assembly rotatably mounted to the frame, and a wheel rotatably mounted to the frame. The bicycle also includes a free wheel gear cluster attached to the wheel for rotating the wheel when the gear cluster is caused to rotate in a forward direction, and for rotating independently of the wheel when the gear cluster is rotated in a reverse direction.

A drive chain, having upper and lower chain runs, interconnects the crank assembly and the free wheel gear cluster, and extends along upper and lower paths, respectively. The first step of the method is to provide an air pump that has a housing having a drive sprocket and a pumping mechanism for pumping air in response to rotation of the drive sprocket. The second step is to position the air pump proximate the drive chain such that the air pump is stationary relative to the bicycle.

The next step is to move either one of the upper or lower runs of the drive chain substantially away from its respective path and engage the selected run with the drive sprocket. Typically, the lower chain run extends through a chain tensioning device, so preferably the lower run is used because the chain tensioning device may be deflected to a forward position such that the lower chain run is maintained in tension between the chain tensioning device and the drive sprocket. A chain retainer mounted to the drive sprocket is used to help maintain the engagement of the drive chain with the drive sprocket, when using either the upper or lower run.

Once the above steps are performed, the crank assembly and free wheel gear cluster is rotated in the reverse direction, so that the selected run moves past the drive sprocket, causing it to rotate. However, since the free wheel gear cluster is being rotated in reverse, the wheel of the bicycle remains stationary.

The present invention also provides an air pump designed for use with a bicycle. As with most bicycles, the bicycle has a frame comprised of one or more elongate tubes, a wheel rotatably mounted to the frame, a crank assembly rotatably mounted to the frame, and at least one gear attached to the wheel. A drive chain engages the gear and is tensionally coupled to the crank assembly by first and second drive chain runs extending along upper and lower paths, respectively, located adjacent the elongate tube. Rotation of the crank assembly thereby causes the gear to rotate, which causes the wheel to rotate in a first direction when the gear is driven in a first direction.

The air pump includes a housing having a hollow interior and a clamp mechanism mounted to the housing. The clamp mechanism is for releasably securing the housing to the elongate tube of the bicycle to permit the housing to be quickly secured to, and detached from, the elongate tube. A sprocket is rotatably mounted to the housing in a fixed, predetermined spaced-apart relation to the clamp mechanism. The sprocket is designed to engage, and be rotatably driven by, the drive chain.

Thus, the sprocket is sized, and the predetermined spaced-apart relation selected, so that when the housing is secured to the elongate tube, one of the first or second runs of the chain may be engaged with the sprocket. Hence, one run of the chain will be deflected from its respective path in an amount sufficient to increase the tension in the chain such that the run is maintained in driving engagement with the sprocket when the chain is driven by the crank assembly. A chain retainer centrally mounted to the sprocket is positioned to aid in maintaining the chain in engagement with the sprocket. A pump mechanism, positioned in the interior of the housing, is coupled the sprocket for providing compressed air in response to rotation of the sprocket.

The pump mechanism includes at least one cylinder sleeve mounted in the interior of the housing. A piston rod having a piston head is mounted in the cylinder sleeve so that the piston head may be driven in a first direction constituting an intake stroke and in a second direction constituting a compression stroke. Air in the cylinder sleeve is compressed during said compression stroke.

Preferably, there are first and second cylinders arranged in an opposed relationship to one another and the piston rod is double ended so that there is a first piston head positioned in the first cylinder and a second piston head positioned in the second cylinder. The piston rod has a bearing slot in its middle portion, which extends at a right angle to the longitudinal axis of the piston rod. A crank pin on a crankshaft is positioned in the bearing slot so that the piston rod reciprocates in response to rotation of the crankshaft. In turn, the crankshaft is coupled to the sprocket, so that rotation of the sprocket causes rotation of the crankshaft. Therefore, rotation of the sprocket causes the piston heads in the cylinder sleeves to reciprocate.

A manifold is mounted to each cylinder sleeve for venting air that is compressed in each cylinder sleeve during each compression stroke of the piston head. Each cylinder sleeve and at least a portion of each associated manifold may be formed as a single integral component. The manifold includes a cylinder head capping one end of a cylinder sleeve, and a one-way valve formed within the cylinder sleeve, intermediate the piston head and the cylinder head, for permitting air compressed during a compression stroke of the piston head to flow out of the cylinder sleeve, but substantially preventing air from flowing into the cylinder sleeve during an intake stroke of said piston head within the cylinder sleeve.

The pump mechanism further includes an intake port for admitting air from a region surrounding the housing into each cylinder sleeve during each intake stroke of the piston head. In one embodiment, the intake port is a skirt formed as a part of each cylinder sleeve. The skirt includes a significantly larger diameter than a main body portion of the cylinder sleeve, so that when a top surface of the piston head is within the skirt, a gap exists around an outer periphery of the top surface of the piston head and an inner periphery of the skirt, for intake of air within the cylinder sleeve.

The present invention also provides a piston for use in an air pump adapted to be powered by a bicycle to inflate bicycle tires. The piston includes a cap having a substantially planar surface forming a head of the piston, and a projection. The projection extends from an opposite side of the cap from the planar surface, and has a notch. A body section of the piston includes a tang that receives and engages the notch on the projection. Finally, a seal, having a hole through which said projection passes, is placed between the cap and the body section, so that it is held in compression.

Other features of the present invention in the preferred embodiments will become apparent from the following detailed description.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Description of First Embodiment

Figure 1:
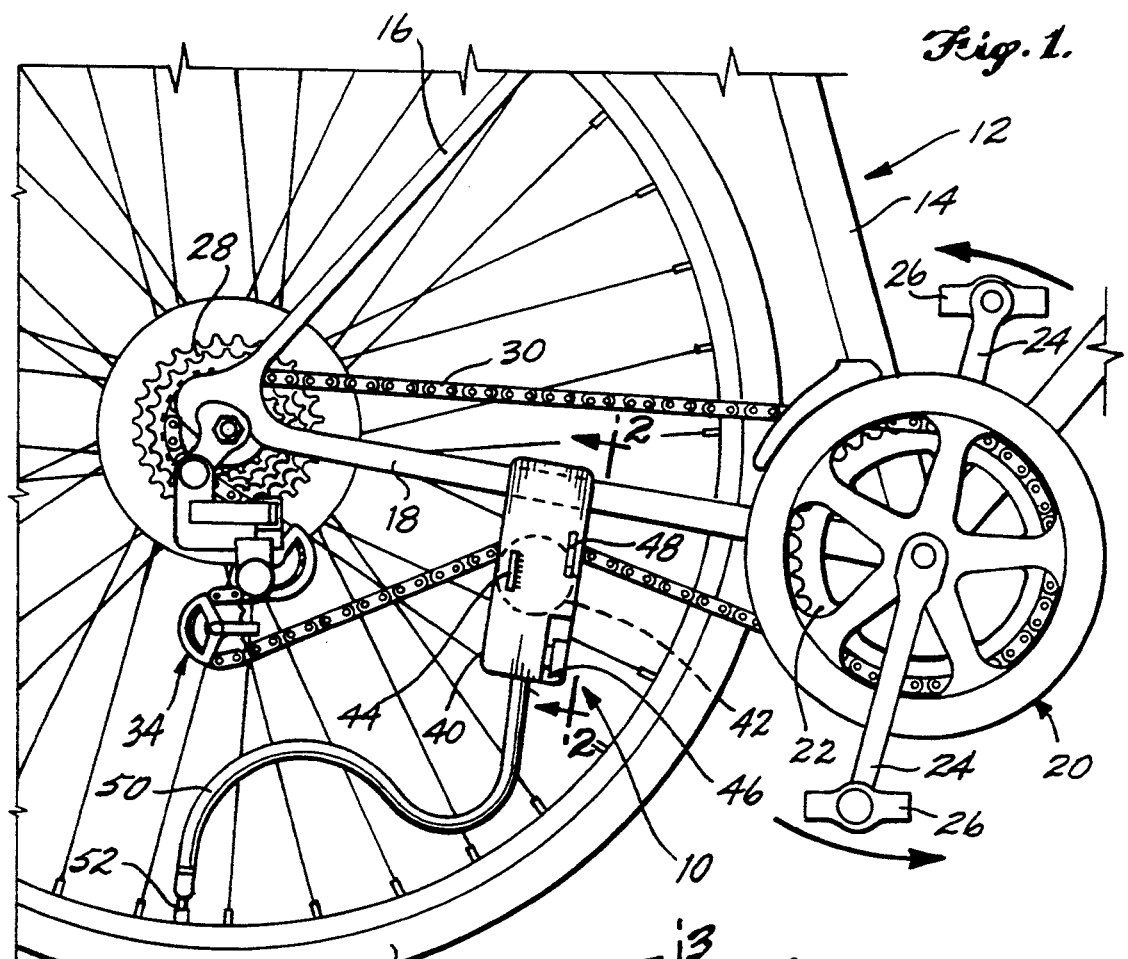
FIG. 1 is a side view of a portion of a bicycle, having an air pump incorporating the present invention mounted thereto so as to be driven by the chain of the bicycle in order to inflate the rear tire thereof.

FIG. 1 shows a first embodiment of an air pump 10 incorporating the present invention mounted to a bicycle, which is indicated generally by reference numeral 12. Bicycle 12 includes a conventional frame having a seat tube 14, seat stays 16, and chain stays 18. A crank assembly 20 is rotatably mounted to the frame at the junction of seat tube 14 and chain stays 18. Crank assembly 20 includes one or more chain rings 22, to which are fixed crank arms 24 that extend radially beyond the outer radii of chain rings 22 and which have pedals 26 mounted to the outer ends thereof. Crank assembly 20 can be rotated in either a forward or reverse direction (clockwise or counterclockwise, respectively, as shown in FIG. 1) by an operator's feet or hands.

A conventional free wheel gear cluster 28 is mounted to the frame at the junction of seat stays 16 and chain stays 18. Conventional free wheel gear cluster 28 is provided with an internal clutch or ratchet system which engages to transmit torque to rotate wheel assembly 32 when tension is applied to drive chain 30 in a forward direction (clockwise in FIG. 1 ) by crank assembly 20. When the bicycle coasts, or crank assembly 20 is peddled in a reverse direction (counterclockwise in FIG. 1), however, the ratchet mechanism of free wheel gear cluster 28 disengages so that rotation of free wheel gear cluster 28 and wheel 32 are independent; in other words, when freewheeling, wheel 32 rotates without rotating free wheel gear cluster 28, and, conversely, free wheel gear cluster 28 can be rotated in a reverse direction without causing rotation of wheel 32. Also, in a conventional manner, drive chain 30 is routed about and engaged by chain ring 22, and an individual sprocket or gear of free wheel gear cluster 28, so that crank assembly 20 and free wheel cluster 28 are interconnected by upper and lower chain runs. As is conventional in a multi-speed bicycle, free wheel cluster 28 is provided with a plurality of individual sprockets; other conventional free wheel mechanisms are known that have only a single rear wheel sprocket. Selective shifting of chain 30 between individual sprockets of free wheel cluster 28, so as to change gear ratios, is accomplished by means of a conventional rear derailleur 34. In normal operation, rear derailleur 34 maintains spring tension on drive chain 30 intermediate chain wheel 22 and free wheel gear cluster 28.

Air pump assembly 10 is mounted to bicycle 12 so that upper portion of housing 40 is hooked over chain stay 18, and the lower run of drive chain 30 is routed over a drive sprocket 76 (shown in FIG. 2), which protrudes from the rear of housing 40, as is indicated generally in FIG. 1 by broken line image 42. The spring tension provided by rear derailleur 34 maintains drive chain 30 in drive engagement with the drive sprocket of air pump assembly 10. Thus, as will be readily apparent to those skilled in the art, the rear derailleur 34, which also functions as a chain tensioning device, is deflected to a forward position when air pump assembly 10 is mounted on chain stay 18, thereby placing the lower run of drive chain 30 in tension between the derailleur 34 and drive sprocket 76.

The front face of housing 40 is provided with a pressure gauge window 44, a clamping lever 46, and a release button 48, the objects and use of each of which will become apparent from the description provided below. Furthermore, an air hose 50 extends outwardly from housing 40, and is connected in a conventional manner to an inflation valve 52 of bicycle tire 54. Air hose 50 is shown in FIG. 1 as reaching the rear tire 54 of bicycle 12; however, it will be understood that air hose 50 will preferably be of sufficient length to reach other inflatable articles, such as, for example, the front wheel of bicycle 12.

With air pump assembly 10 mounted on bicycle 12 as shown in FIG. 1, an operator can rotate crank assembly 20 in a reverse direction, so as to cause drive chain 30 and free wheel gear cluster 28 to rotate in the same direction without causing rotation of wheel assembly 32 or movement of bicycle 12. As the lower run of drive chain 30 passes over the sprocket of air pump assembly 10, it causes that drive sprocket to rotate (in a clockwise direction in FIG. 1), operating the pump mechanism, which is enclosed in housing 40, while the forwardly deflected derailleur maintains tension in the drive chain 30 over drive sprocket 76 to prevent its disengagement from the drive socket.

Figure 2:
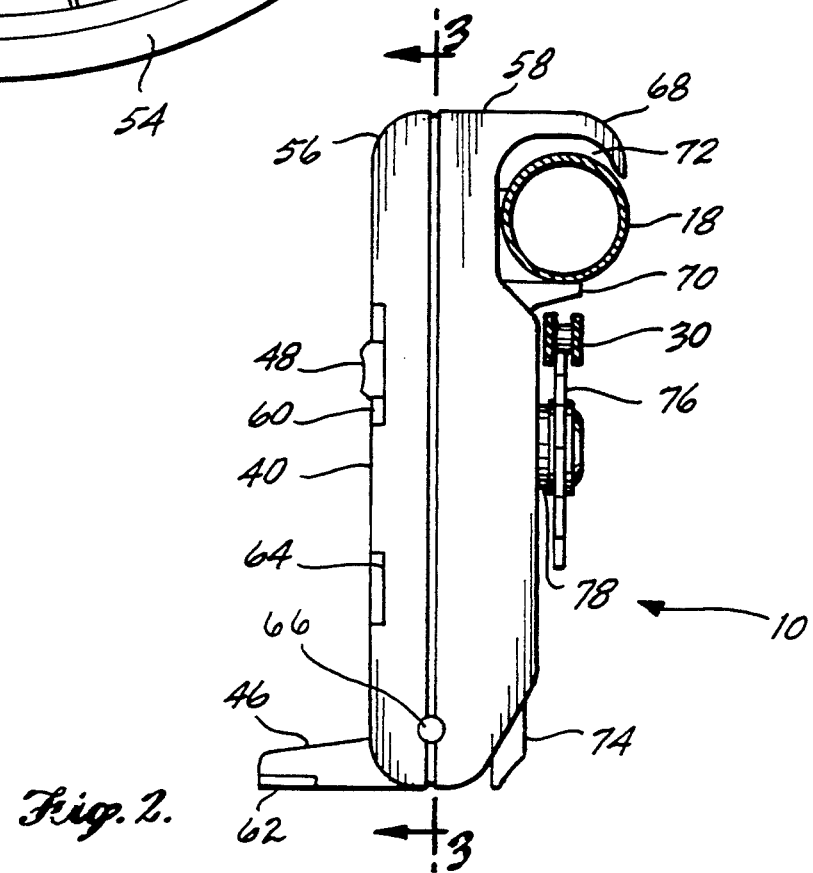
FIG. 2 is an elevational side view of the air pump, taken along section line 2—2 of FIG. 1 to show the frame tube of the bicycle in a cross section and a link of the chain.

FIG. 2 shows a side view of pump assembly 10. Housing 40, which is preferably fabricated of a suitable high strength plastic such as polycarbonate, generally comprises a front case section 56 and a rear case section 58. Front case section 56 has an opening 60 through which release button 48 protrudes so as to be easily actuated by the thumb or finger of an operator. Furthermore, clamping lever 46 extends, when in the clamped position, in a generally perpendicular direction from front case section 56; ear 62, which extends generally at a right angle from clamping lever 46 so as to make it easier to grip, is received in a recess 64 in front case section 56 when clamping lever 46 is in the released position. Clamping lever 46 is attached to pivot pin 66, which is received in a cooperating bore in housing 40, so as to be pivotable between the released and clamped positions.

As will be described in greater detail below, to mount air pump assembly 10 to a bicycle 12, pump assembly 10 is positioned about chain stay 18 so that chain stay 18 is received in a gap intermediate a rearwardly extending hook portion 68 of rear case section 58 and a mandible portion 70 of a vertically movable clamping member, which is housed within housing 40. A resilient cushioning insert 72 is fitted within the interior of hook portion 68 so as to provide a yielding grip when chain stay 18 is clamped intermediate mandible portion 70 and hook portion 68; this arrangement reduces the risk of damage to both the chain stay and the internal clamping mechanism of pump assembly 10. Cushioning insert 72 may comprise any suitable elastomeric resilient material, such as, for example, polyurethane foam, synthetic or natural rubber, or the like. A plurality of interchangeable cushioning inserts having gripping faces contoured to accommodate a variety of different-sized chain stays may be provided; typical conventional chain stays taper and have midsection diameters ranging between about 5/8 inch and 1 inch.

The lower end of the clamping member to which mandible portion 70 is mounted protrudes from the bottom of rear case section 58 to provide a hand-actuated push rod 74, the use of which will also be described in greater detail below.

With further reference to FIG. 2, drive chain 30 is shown routed over drive sprocket 76, which in turn is fixed to crankshaft 78. As was noted above, the spring tension applied by rear derailleur 34 maintains drive chain 30 in drive engagement with the upper portion of drive sprocket 76. As used in this description and the appended claims, the term "sprocket" includes any gear, friction wheel, pulley wheel, or other form of wheel suitable for engaging chain 30 to be rotatably driven thereby. Drive sprocket 76 may preferably be provided with approximately 10 teeth, while conventional chain rings 22 typically have between 38 and 52 teeth; accordingly, a significant gear ratio reduction is achieved between chain rings 22 and drive sprocket 76, which, provides the operator with a substantial speed advantage in operating air pump assembly 10, coupled with the mechanical advantage determined by the length of crank arm 20.

Figure 3:
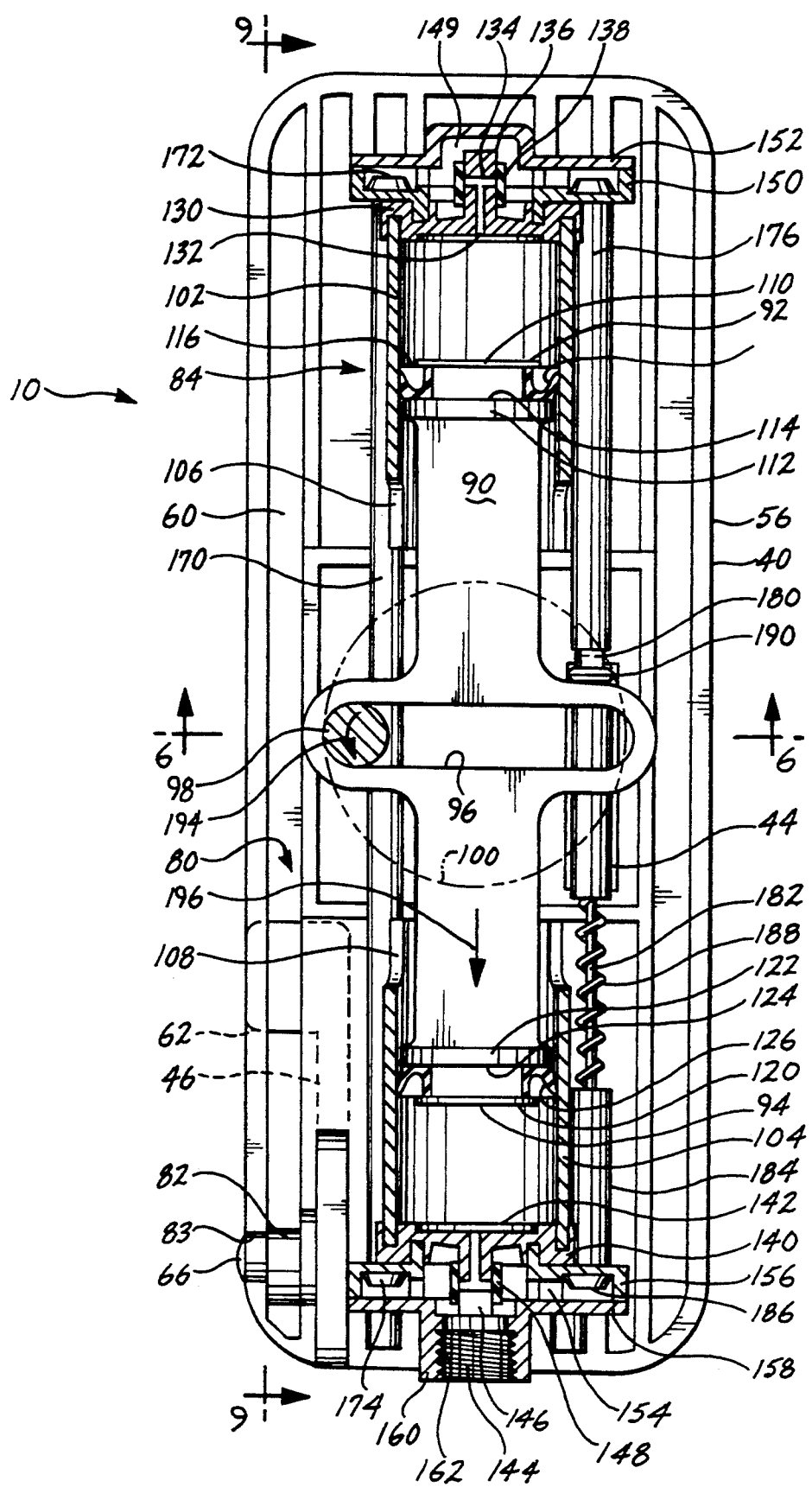
FIG. 3 is a cross section through the air pump taken along section line 3—3 in FIG. 2, showing the arrangement of the cylinders, pistons, and other components within the housing of the air pump.

Turning now to FIG. 3, the internal components of air pump assembly 10 will now be described in greater detail. Case section 56 is provided with a vertically extending guide slot 80, which accommodates the vertically moving clamping member and associated parts which will be described below. In the upper portion of guide slot 80 is the opening 60, through which release button 48 protrudes. At the base of guide slot 80 is a cam 82, which is mounted to pivot pin 66. Pivot pin 66 is rotatably mounted in cooperating bore 83 in housing 40. Clamping lever 46 is also mounted to pivot pin 66, so that movement of clamping lever 46 from the released position to the clamped position causes rotation of cam 82.

Housing 40 also encloses a double-acting air pump section, as indicated generally by reference numeral 84. Air pump section 84 includes a double-ended piston rod 90 having a first piston head 92 at its upper end and a second piston head 94 at its lower end. Double-ended piston rod 90 is preferably constructed of a strong, resilient, lightweight material having good wear characteristics, such as, for example, a moldable acetal engineering plastic available under the name DELRIN ™ from E. I. DuPont de Nemours & Company, Polymer Products Department, Market Street, Wilmington, Del. Double-ended piston rod 90 is also provided with a central bearing slot 96 extending perpendicular to the longitudinal axis of piston rod 90. Bearing slot 96 receives a crank pin 98 which is mounted eccentrically on a crank wheel, indicated generally by broken line image 100 in FIG. 3, which in turn is mounted to crankshaft 78 (shown in FIG. 2). Rotation of the crank wheel drives crank pin 98 in beating slot 96 so as to produce translational, reciprocating motion of double-ended piston rod 90. Crank pin 98 may be sleeved with an external bushing to enhance wear characteristics.

Piston head 92 is received in upper cylinder sleeve 102, and lower piston head 94 is received in lower cylinder sleeve 104. Cylinder sleeves 102 and 104 consequently share a common axis and are arranged in opposition to one another. Cylinder sleeve 102 is provided with intake ports 106, which communicate with the atmosphere; similarly, lower cylinder sleeve 104 is provided with intake ports 108. In this embodiment, cylinder sleeve 102 is constructed of a metal having suitable weight, wear, and bearing characteristics, such as brass or aluminum, for example.

Piston head 92 is provided with an end flange 110 at its upper end, and a shoulder 112, which, together, define a piston ring groove 114. A resilient seal 116 is mounted in groove 114. Resilient seal 116 is of a type known as a "U-cup seal" to those skilled in the art. Seal 116 is provided with a flared, relatively thin, flexible outer rim 118, which fits closely against the inner surface of cylinder sleeve 102 and which flexes inwardly during the intake stroke so as to form a gap that permits the passage of air past seal 116. Seal 116 expands outwardly during the compression stroke to prevent the escape of air. Similarly, lower piston head 94 is provided with a corresponding end flange 120 and shoulder 122 defining a groove 124 in which a U-cup seal 126 is mounted.

The seal arrangement described in the preceding paragraph has the advantages of simplicity and reliability; it will be understood, however, that many types of valves and seals known to those skilled in the art could be substituted for the seal arrangement illustrated so as to admit air into the cylinder sleeve during the intake stroke, without departing from the spirit or scope of the present invention.

Cylinder sleeve 102 is capped at its upper end by cylinder head 130. Cylinder head 130 is provided with an exhaust port 132, which communicates with a T-shaped exhaust passage 134 within a central nipple 136 that extends longitudinally from the outer end of cylinder head 130. An elastomeric sleeve 138 fits closely about the exterior of nipple 136, covering the open ends of T-shaped exhaust passage 134. Elastomeric sleeve 138 functions as a one-way exhaust valve. As air is compressed by piston head 92 during the compression stroke (so that the pressure of the air in cylinder sleeve 102 exceeds that exterior to elastomeric sleeve 138), the compressed air vents through exhaust port 132 and exhaust passage 134, expands elastomeric sleeve 138 outwardly about nipple 136, and escapes through a gap formed intermediate nipple 136 and elastomeric sleeve 138. During the intake stroke of piston 92, when the air pressure exterior to elastomeric sleeve 138 exceeds that in cylinder sleeve 102, elastomeric sleeve 138 is drawn against the open ends of exhaust passage 134 by the pressure differential, effectively sealing the open ends of T-shaped exhaust passage 134.

Here again, the exhaust valve arrangement described in the preceding paragraph is advantageous in its simplicity and reliability; however, many other types of exhaust valves could be substituted for the nipple and elastomeric sleeve arrangement illustrated so as to permit the venting of compressed air from the cylinder sleeve during the compression stroke. For example, a flapper valve arrangement may be provided by eliminating nipple 136 and exhaust passage 134 so as to provide a relatively flat outer cylinder head end, and then positioning a thin flap of elastomeric material or metal shim stock over the open upper end of exhaust port 132.

Lower cylinder sleeve 104 is similarly provided with a cylinder head 140 having an exhaust port 142 leading to a T-shaped exhaust passage 144 in longitudinally extending nipple 146, which has an elastomeric sleeve 148 fitted over the open ends of exhaust passage 144.

A manifold chamber 149 is formed about nipple 136 on cylinder head 130 between an inner manifold case 150, which is sealingly mounted to the outer end of cylinder head 130, and an outer manifold case 152, which is sealingly mounted to inner manifold case 150. Accordingly, compressed air is vented through T-shaped exhaust passage 134 and nipple 136 into manifold chamber 149.

A manifold chamber 154 is similarly formed about longitudinally extending nipple 146 of lower cylinder head 140 by inner manifold case 156 and outer manifold case 158. The outer manifold case 158 fitted to lower cylinder head 140 is further provided with a central boss 160 having an internally threaded passageway 162 in communication with manifold chamber 154 which forms an attachment fitting for air hose 50 (see FIG. 1). Accordingly, compressed air introduced into manifold chamber 154 by the action of pump assembly 84 is discharged through opening 162 and air hose 50 to the article to be inflated.

A hollow equalizer tube 170 has an open upper end 172, which penetrates manifold case 150, and is sealed thereto, so that the interior of equalizer tube 170 communicates with manifold chamber 149. The lower end 174 of equalizer tube 170 similarly penetrates inner manifold case 156. Accordingly, compressed air discharged into upper manifold chamber 149 during the compression stroke of upper piston 92 flows through equalizer tube 170 and enters lower manifold chamber 154. Thus, the compressed air from each cylinder 102, 104 enters manifold chamber 154 and is discharged through opening 162.

Figure 8:
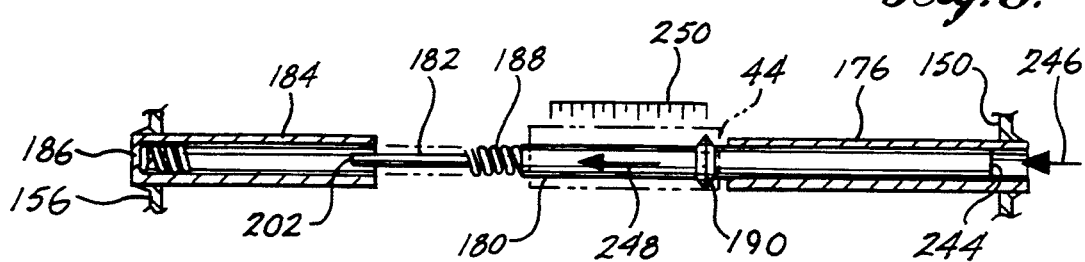
FIG. 8 is a side view of a longitudinal section of the pressure indicator section of the pump of FIGS. 1-7.

Inner manifold case 150 is also penetrated by hollow pressure indicator tube 176 so as to establish communication between upper manifold chamber 149 and the interior of pressure indicator tube 176. As is also shown in FIG. 8, a pressure indicator rod 180 is slidingly received in pressure indicator tube 176, and has a closed end, which forms a seal in tube 176, and against which air pressure entering pressure indicator tube 176 from manifold chamber 149 bears. A guide rod 182 extends coaxially from the opposite end of pressure indicator rod 180, and has a lower end that extends into an upper portion of hollow guide tube 184. The lower end 186 of guide tube 184 is sealed to prevent the escape of compressed air therethrough from lower manifold chamber 154. A coil spring 188 surrounds guide pin 182 and extends from the lower end of indicator rod 180 into guide tube 184 to closed lower end 186. The lower end of pressure indicator rod 180 and the upper end of guide tube 184 are open to the atmosphere (within housing 40). Accordingly, an air pressure in upper manifold chamber 149 that exceeds atmospheric pressure will tend to force pressure indicating rod 180 downwardly out of pressure indicating tube 176. Spring 188 regulates the amount or distance by which indicator rod 180 is displaced due to a particular pressure differential. A marker ring 190 is visible from the exterior of the case through window 144, and its position can be compared with a scale on the exterior of the case to determine the pressure of the air in manifold chamber 149. Inasmuch as upper manifold chamber 149 communicates through equalizer tube 170 and lower manifold chamber 154 with air hose 50 and the article being inflated, the pressure to which the article has been inflated can thus be determined. While the pressure gauge assembly described in this paragraph is particularly compact, sturdy, and reliable, other suitable air gauge mechanisms, such as dial-type gauges, are known to those skilled in the art and may alternatively be employed in the present invention.

Figure 4:
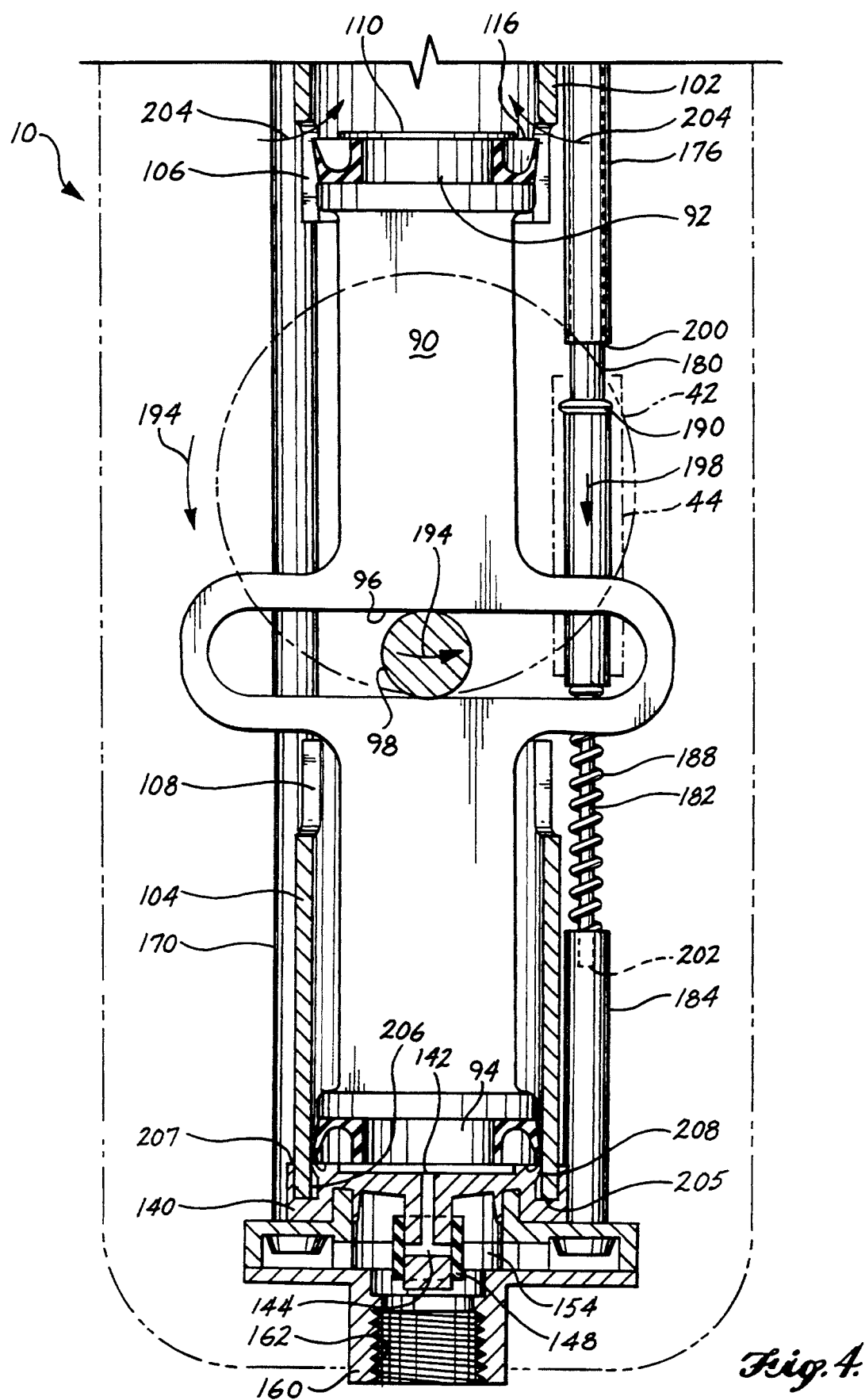
FIG. 4 is an elevational view of a lower portion of a section through the air pump of FIGS. 1-3, showing the rotation of the crank arm to a first position in which the lower piston is at the end of the compression stroke, and the upper piston is at the end of the intake stroke.

Having described the components of pump assembly 84, the operation thereof will now be described in greater detail. With further reference to FIG. 3, it will be seen that the motion of drive chain 30 as crank assembly 20 is backpedaled in a reverse direction causes eccentric crank pin 98 to rotate in the direction indicated by arrow 194. The rotational motion of eccentric crank pin 98 in cooperation with bearing slot 96 causes double-ended piston rod 90 to reciprocate up and down as crank pin 98 moves repeatedly along a circular path. In the view shown in FIG. 3, crank pin 98 is shown located in a first position at a first end of bearing slot 96. In this position, piston rod 90 is in the middle of its stroke, and moving downwardly as indicated by arrow 196; accordingly, lower piston head 94 is moving downwardly in a compression stroke and compressing the air in cylinder sleeve 104 so that it exits through exhaust port 142 and exhaust passage 144, while upper piston head 92 is on an intake stroke in which air is moving past the rim 118 of seal 116 and into cylinder sleeve 102. FIG. 4 shows a view in which the crank pin 98 has rotated 90° from the position in which it was shown in FIG. 3. Crank pin 98 is consequently located at the lowermost position along its circular path, and is centrally located in bearing slot 96. In this position, lower piston head 94 is at the end of its compression stroke, having forced the air in cylinder sleeve 104 out through exhaust port 142 and into lower manifold chamber 154. As was discussed above, the air pressure in manifold chamber 154 is transmitted via equalizer tube 170 and upper manifold chamber 149 to pressure indicator tube 176, forcing pressure indicating rod 180 downwardly in the direction indicated by arrow 198. Indicator ring 190 reacts against tube mouth 200 to limit movement in the opposite direction. It will be observed in FIG. 4 that the lower end 202 of guide pin 182 extends into guide tube 184 for only part of the length thereof, so as to provide room for rod 180 to be displaced downwardly without the lower end 202 of guide rod 182 contacting the lower end of guide tube 184.

With further reference to FIG. 4, it is seen that when upper piston head 92 is at the lower end of its intake stroke, the upper edge of seal 116 and flange 110 have moved below the upper edges of upper piston ports 106, thus admitting air from the atmosphere into the interior of cylinder sleeve 102 in the direction indicated by arrows 204. The interior of cylinder sleeve 102 is thus fully charged with air to atmospheric pressure prior to commencement of the compression stroke. The upper edges of piston ports 106 are preferably beveled or chamfered so as to prevent catching the edge of seal 116.

FIG. 4 also shows that the lower end of lower cylinder sleeve 104 is received in a circumferential groove 205 formed in the upper side of lower cylinder head 140. Circumferential groove 205 is bounded by inner wall 206 and outer wall 207. A circumferential angled skirt 208 depends from inner wall 206, and bears against the inner surface of cylinder sleeve 104 so as to form an effective seal. Skirt 208 may have, prior to installation, an outside diameter slightly greater than the inside diameter of cylinder sleeve 104, so that when installed skirt 208 is slightly compressed against the inner wall of cylinder sleeve 104, contributing to the effectiveness of the seal.

Figure 5:
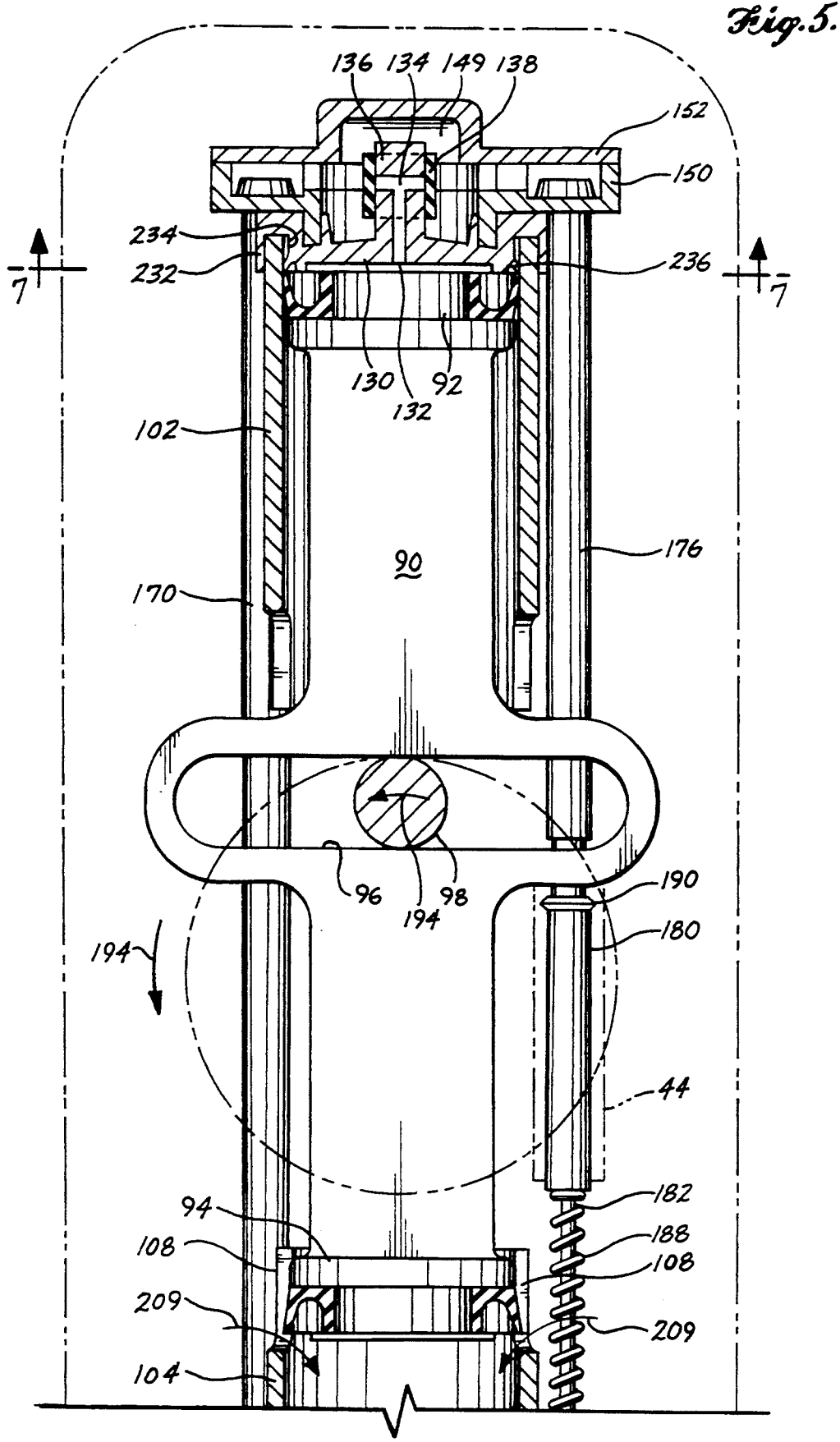
FIG. 5 is a view similar to that shown in FIG. 4, in which the crank arm has rotated to a second position in which the lower piston is at the end of the intake stroke and the upper piston is at the end of the compression stroke.

In FIG. 5, crank pin 98 has rotated 180° from the position shown in FIG. 4. In this position, piston rod 90 is at its uppermost position, so that upper piston head 92 is now at the end of its compression stroke, and lower piston head 94 is at the end of its intake stroke. Lower cylinder ports 108 are thus opened to admit air in the direction indicated by arrows 209.

Accordingly, it will be apparent that the double-piston arrangement of air assembly 10 provides two compression strokes for each revolution of drive sprocket 76 and crank pin 98. Not only does this provide a relatively constant flow of compressed air from the pump, but it also ensures a relatively rapid delivery of compressed air, particularly in view of the high speed of chain movement, which can readily be achieved through manual rotation of the bicycle crank assembly. Still further, the excellent hand grip and mechanical advantage provided to the operator by crank arms 24 and pedals 26 of crank assembly 20 (see FIG. 1) renders it relatively easy for the operator to use pump assembly 10 to achieve the high air pressures required to inflate many articles. Additionally, rotating crank assembly 20 in a continuous circular motion is far more efficient than reciprocating the operator's hands and arms back and forth, as is required for operation of the conventional bicycle pumps described above, since the rotational motion eliminates the need to repeatedly accelerate and decelerate the mass of the operator's hands and arms; this advantage of the present invention is further enhanced by the flywheel effect of the rotating crank assembly 20 and free wheel gear cluster 28. It will also be appreciated that the air pump of the present invention utilizes the drive system of a conventional bicycle to achieve the foregoing advantages; yet, unlike many of the known cycle-mounted air pumps described above, does not rotate with a wheel of the bicycle and does not require that the bicycle be in motion. Accordingly, the air pump of the present invention is useful for inflating stationary objects, and not just the tires of a moving bicycle.

Figure 6:
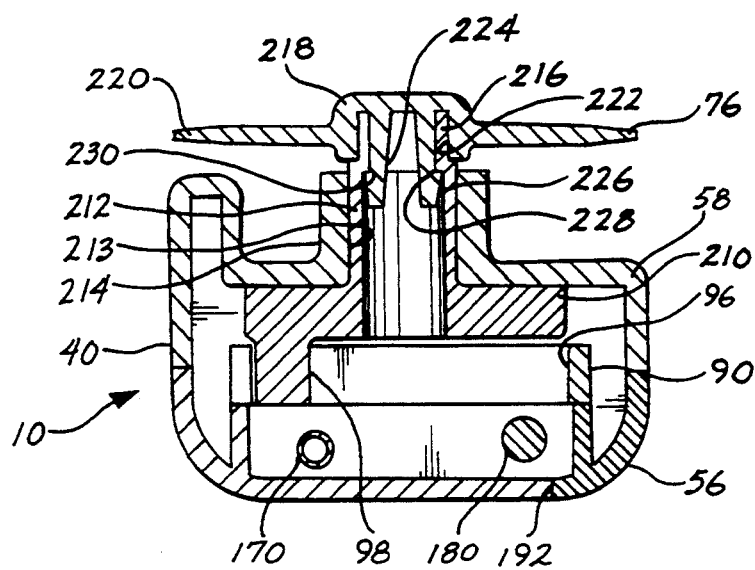
FIG. 6 is a cross-sectional view of the air pump of FIGS. 1-5, taken along section line 6—6 in FIG. 3, showing the sprocket and crank assembly of the pump.
Figure 7:
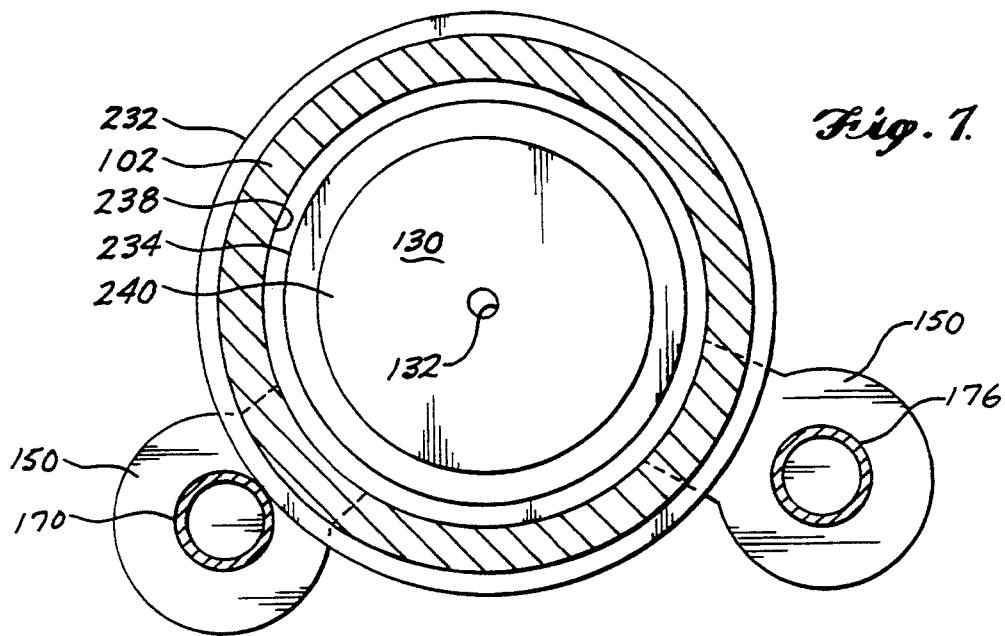
FIG. 7 is a cross-sectional view of the air pump taken along section line 7—7 of FIG. 5, showing the lower surface of the cylinder head thereof.

Turning now to FIGS. 6–8, the arrangement of several components of air pump assembly 10 will be described in greater detail. FIG. 6 shows the drive sprocket, crankshaft, and piston rod relationship. As was previously described, crank pin 98 is retained in beating slot 96 in double-ended piston rod 90. Crank pin 98 is mounted proximate the periphery of crank wheel 210, and hollow crankshaft 78 extends axially from the center of crank wheel 210 through a cooperating bore 213 formed in a boss 214 which extends from rear case section 58. The outer end 216 of crankshaft 78 is provided with external splines. In this embodiment, crankshaft 78, crank wheel 210, and crank pin 98 are preferably fabricated unitarily of a suitable material, such as nylon or DELKIN TM.

Drive sprocket 76 has a central hub 218 about which teeth 220 are radially distributed. The inner face of hub 218 is provided with a cylindrical receptacle 222 which has internal splines about its perimeter which are configured to mate with and engage the external splines on crankshaft end 216. Locking fingers 224 project outwardly from cylindrical receptacle 222 about the axis of hub 218 and are configured to fit closely within the interior of the open upper end 216 of crankshaft 78. The lower end of each locking finger 224 has a ramp 226 on its outer face which slopes outwardly from its lower end, and a notch 228 at the upper terminus of the ramp 226. To fit sprocket 76 to crankshaft 78, locking fingers 224 are pressed into the open upper end 216 of crankshaft 78, ramps 228 cause fingers 224 to flex inwardly toward the axis of sprocket 76, until notches 228 reach internal shoulders 230 inside crankshaft 78, so that fingers 224 expand outwardly. Sprocket 76 is consequently secured on crankshaft 78 by the abutment of notches 228 with shoulder 230, and the splines on sprocket 76 and crankshaft 78 are engaged so that rotation of sprocket 76 causes rotation of crankshaft 78.

FIG. 7 shows the relationship of cylinder head 130 with upper cylinder sleeve 102. The wall of cylinder sleeve 102 is received in a groove defined intermediate outer wall 232 and inner wall 234 of cylinder head 130 (see also FIG. 5). Circumferential cylinder head skirt 236 extends from inner wall 234 and abuts the inner surface 238 of cylinder sleeve 102 so as to form a seal, as was described above with reference to FIG. 4. Central portion 240 of cylinder head 130 is recessed relative to inner wall 234 to receive the upper flange 110 of upper piston head 92, so as to help ensure complete discharge of the air in cylinder sleeve 102 during the final phase of the compression stroke. Exhaust port 132 is centrally located in recessed portion 240. Also visible in FIG. 7 are equalizer tube 170 and pressure indicator tube 176, which extend downwardly from manifold case 150.

FIG. 8 shows the pressure indicator portion of air pump assembly 10 which was described above with reference to FIG. 3. As noted above, air pressure in upper manifold chamber 149 acts against the end of indicator rod 180 in the direction indicated by arrow 246, tending to push or deflect pressure indicator rod 180 out of tube 176 in the direction indicated by arrow 248. The position of indicator ring 190 can be viewed through window 44 and compared with scale markings 250 to conveniently and accurately determine the air pressure.

In an air pump assembly 10 as has been described above, cylinder sleeves 102, 104 having cylinder bores of about 0.650", and a crank wheel 210 and crank pin 98 providing a stroke of about 1.00", have been found eminently suitable for use for inflating the tires of bicycles, such as mountain bikes, which have relatively large, low-pressure tires; for bicycles having relatively small, high-pressure tires, it may be preferable to employ somewhat smaller bores, on the order of about 0.50" for example, with the 1.00" stroke. Furthermore, it may be desirable in some versions of the present invention to provide an air pump assembly having first and second sleeves with different sized bores, one for attaining relatively low inflation pressures and the other for attaining relatively high inflation pressures.

Figure 9:
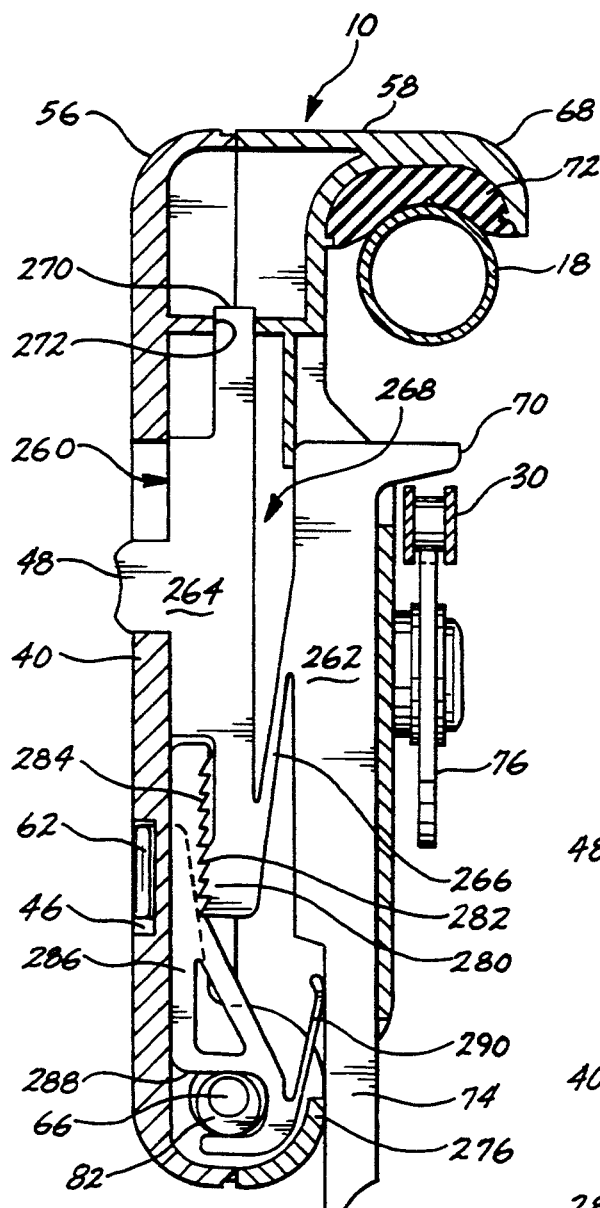
FIG. 9 is a longitudinal cross-sectional view of the air pump, taken along section line 9—9 of FIG. 3.
Figure 10:
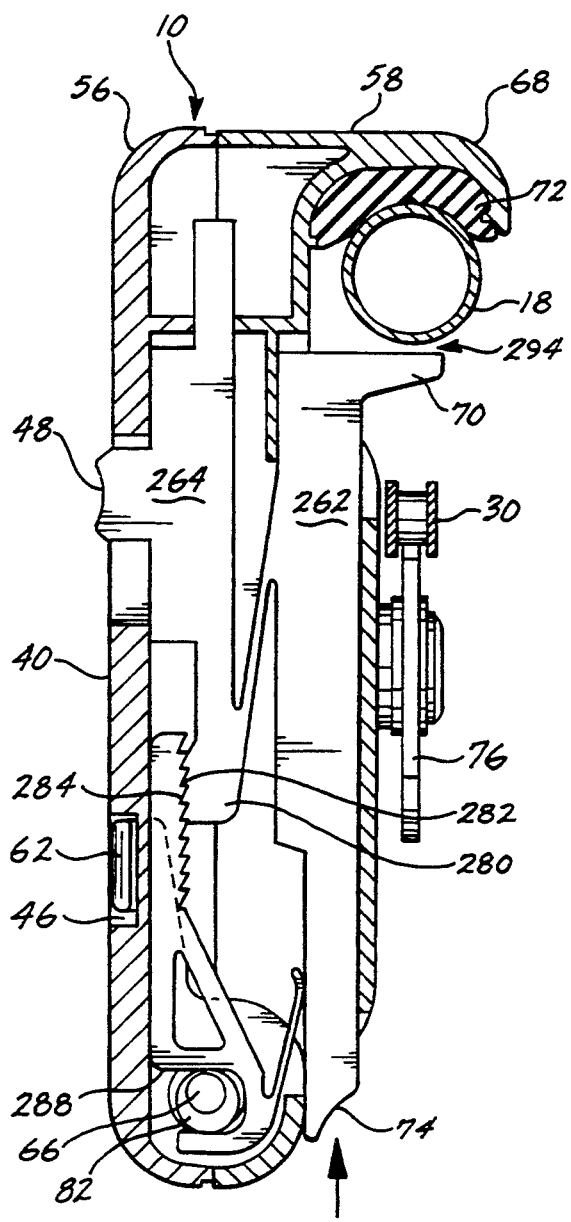
FIGS. 10-11 are longitudinal views of cross sections through the air pump of FIGS. 1-8, similar to FIG. 9 showing the sequential steps in the use of the internal ratchet mechanism of the air pump assembly to secure the pump to the bicycle.
Figure 11:
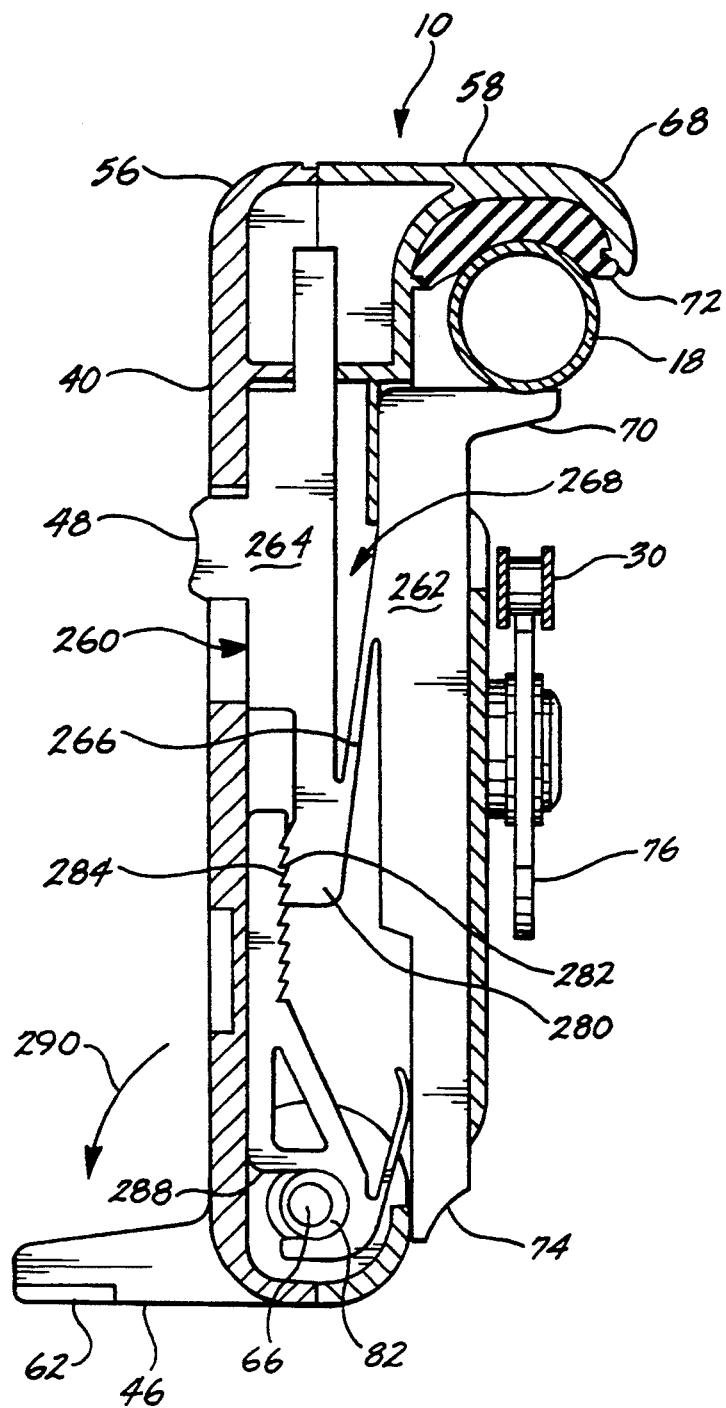

Turning now to FIGS. 9–11, the mechanism and procedure for mounting an air pump according to the present invention to a bicycle will be described. FIG. 9 shows air pump assembly 10 as initially positioned on bicycle 12. To achieve this initial position, the operator positions drive chain 30 on the upper portion of sprocket 76, and then lifts hook portion 68 over chain stay 18 so that mandible 70 is positioned beneath chain stay 18. As used in this description and the appended claims, the terms vertical, horizontal, up, down, and the like refer to orientations, directions, and the like with respect to the normal upright orientation of a bicycle.

Mandible 70 is an integral portion of a clamping member 260 which is movable vertically within slot 80 in housing 40. Clamping member 260 comprises (a) a vertically elongate jaw portion 262 and (b) a vertically elongate locking portion 264, which are interconnected by (c) an elongate, relatively narrow bridge portion 266. Bridge portion 266 is semi-rigid and extends in an angled direction, relative to the jaw and locking portions so as to bias these apart from one another so that they are separated by vertically extending gap 268. Bridge portion 266 readily bends or flexes inwardly when pressure is applied manually to release button 48, however, it is sufficiently rigid that adequate upwardly directed compressive forces will be transmitted through bridge 266 from locking portion 264 to jaw portion 262 to establish an effective grip on chain stay 18 between mandible portion 70 and hook portion 68, as will be described below. In a clamping member fabricated unitarily of DELRIN TM, a bridge portion 266 angled at 10° from vertical and having a width of about 0.125 inches and a thickness of about 0.06 inches has been found suitable. Furthermore, while bridge 266 is a particularly inexpensive and effective structure for interconnecting the jaw and locking portions as described in this paragraph, those skilled in the art will recognize that other structures may be used to achieve this relationship in the clamping member of the present invention; for example, a coil spring may be used to bias the jaw and locking portions apart while vertically abutting portions transmit the force in the vertical direction.

A guide rod 270 extends upwardly from locking portion 264, and passes through cooperating bore 272 formed in case sections 56 and 58, so as to maintain the vertical alignment of locking portion 264. Similarly, push rod 74 extends downwardly from jaw portion 262 and passes through cooperating bore 276 in rear case section 58.

A ratchet portion 280 extends downwardly from locking portion 264, and is provided with ratchet teeth 282. Ratchet teeth 282 are configured to engage ratchet teeth 284 on ratchet actuator 286, when biased into contact therewith by bridge portion 266. Ratchet teeth 282, 284 permit clamping member 260 to move upwardly with respect to ratchet actuator 286 while the teeth are in engagement, but prevent downward movement of these parts while engaged.

The lower end of ratchet actuator 286 is provided with a transverse slot 288 having an upper side, which abuts cam 82. The lower end of ratchet actuator 286 is also provided with a spring blade 290, which bears against the side of push rod 74 so as to bias the lower end of ratchet actuator 286 towards cam 82 in order to maintain it in position in slot 288.

The next step in the mounting procedure is to manually reduce the gap between mandible 70 and chain stay 18. The operator presses upwardly on the lower end of push rod 74, causing the entire clamping member 260 to move upwardly, ratchet portion 280 moving upwardly relatively to ratchet actuator 286. A minimum gap between intermediate mandible 70 and chain stay 18 is thus quickly attained, as is shown in FIG. 10. Preferably, the gap 294 intermediate mandible 70 and the lower portion of chain stay 18 is reduced to a distance that is less than the vertical travel between adjacent pairs of teeth 282, 284.

In the final mounting step, the operator rotates lever 46 outwardly and downward in the direction indicated by arrow 290 in FIG. 11, to rotate cam 82 in slot 288, causing ratchet actuator 286 to move upwardly relative to housing 40. The upwardly directed force is transmitted through teeth 282, 284 to ratchet portion 280, and through angled bridge portion 266 to jaw portion 262, thereby reducing the gap between mandible 70 and rear hook portion 68 of housing 40. Mandible 70 contacts the lower portion of chain stay 18 and forces the upper portion of chain stay 18 into resilient cushioning insert 72. Chain stay 18 is thus firmly gripped between mandible 70 and hook 68, so as to keep air pump assembly 10 stationary during its operation. Resilient insert 72 increases the effectiveness of this grip, and also reduces the possibility of damaging ratchet teeth 282, 284 and chain stay 18.

In order to release air pump assembly 10 from the bicycle, the operator first returns clamping lever 46 to the released position shown in FIG. 10. The operator then presses release button 48 inwardly into housing 40 to bend bridge 266 and move locking portion 264 towards jaw portion 262, thereby disengaging ratchet teeth 282, 284. Clamping member 260 is thus freed to move downwardly in housing 40 relative to ratchet actuator 286, widening the gap between mandible 70 and hook 68. In some versions, it may be desirable to provide a spring assist for moving clamping member 60 downwardly; for example, a coil spring may be positioned about guide rod portion 270.

Description of Second Embodiment

A second preferred embodiment of an air pump in accordance with the present invention, having several advantages over the previously described first embodiment, is illustrated in FIGS. 12-19. Many of the elements of the air pump shown in FIGS. 12-19 are identical to those previously described in connection with FIGS. 1-11, and are indicated where possible with an identical reference numeral with the addition of a prime designation (') to distinguish over the first preferred embodiment.

Figure 12:
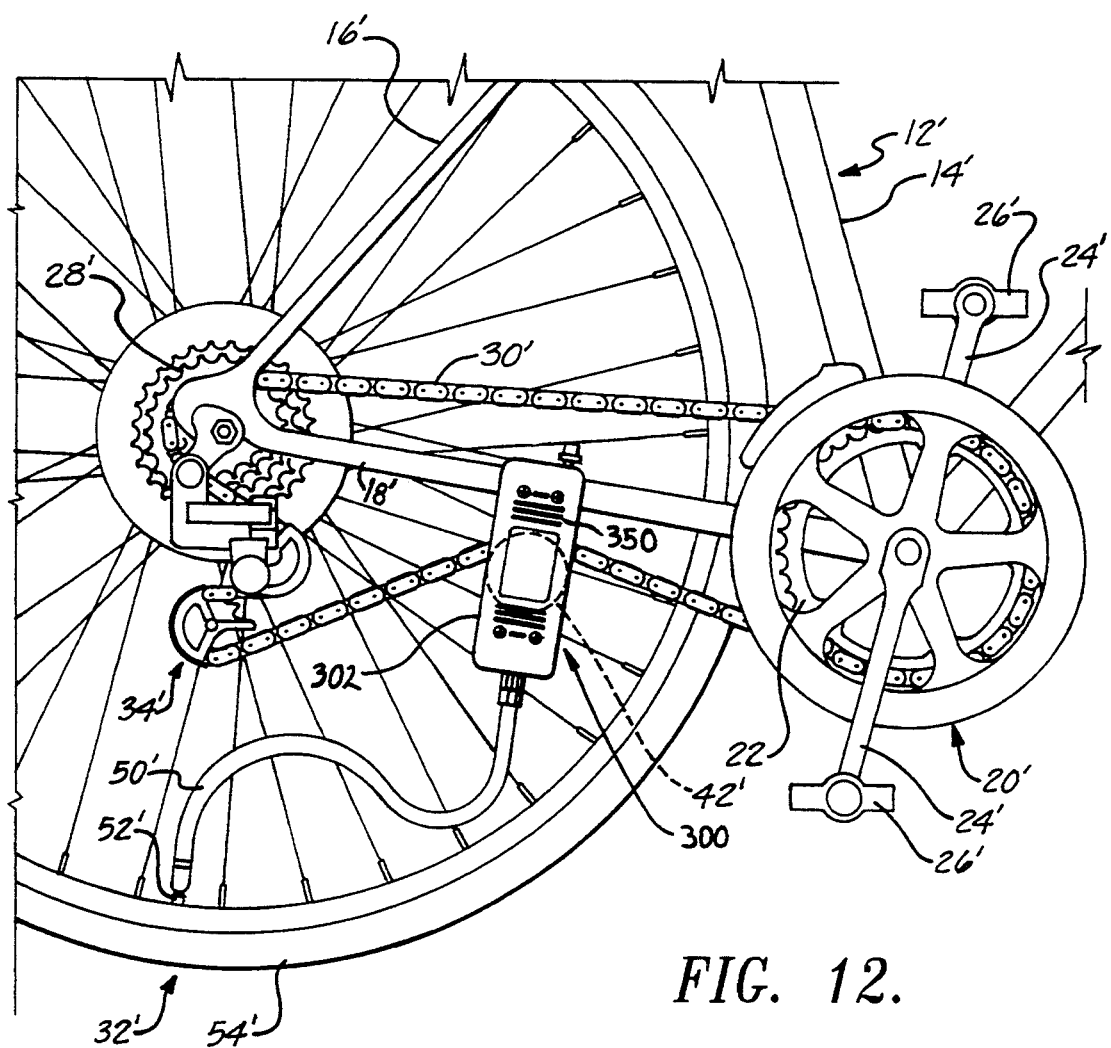
FIG. 12 is a side elevational view of a portion of a bicycle, showing a second preferred embodiment of an air pump in accord with the present invention mounted thereto so as to be driven by the chain of the bicycle in order to inflate the rear tire.

Shown in FIG. 12 is an air pump 300 in accordance with the second preferred embodiment, mounted to a bicycle 12'. Air pump 300 attaches to bicycle 12' in substantially the same manner as air pump 10, with a few differences as shall be described. As with air pump 10, air pump 300 attaches to the chain stay 18' of bicycle 12', so that the lower run of drive chain 30' is routed over a drive sprocket 76', visible in FIG. 13, that protrudes from the rear of air pump 300 (indicated generally by broken line image 42' in FIG. 12). The spring tension provided by rear derailleur 34' maintains drive chain 30' in drive engagement with the drive sprocket 76'. Thus, the rear derailleur 34', which functions in part as a chain tensioning device, is deflected to a forward position, thereby placing the lower run of drive chain 30' in tension between the derailleur 34' and the drive sprocket 76', as with previously described embodiments.

Figure 13:
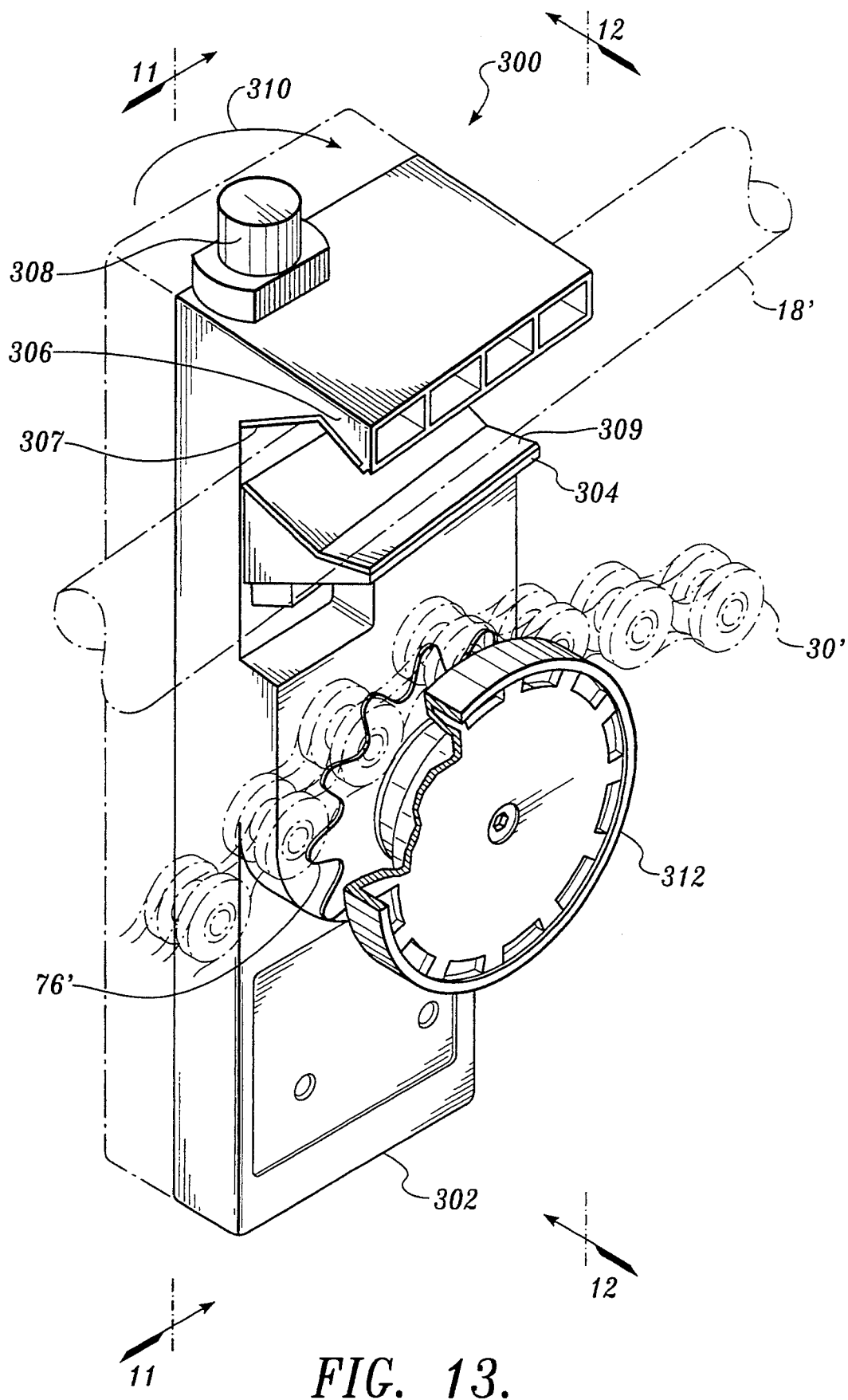
FIG. 13 is an isometric representation of the air pump of FIG. 12, except for the hose, showing a portion of the bicycle in phantom view.

However, as best seen in FIG. 13, this embodiment includes an improved feature regarding the manner of attachment of air pump 300 to chain stay 18'. Attached to the housing 302 of air pump 300 is a vertically movable mandible 304, positioned oppositely, and facing towards a hook portion 306 of the housing 302. Mandible 304 moves vertically in the orientations shown in FIGS. 12 and 13 in response to rotation of a knob 308, so that a clamping area is formed between mandible 304 and hook portion 306. Preferably, mandible 304 moves upwardly in response to clockwise rotation of the knob 308, i.e., in the direction of an arrow 310 in FIG. 13, and downwardly in response to counter-clockwise rotation of knob 308.

Figure 19:
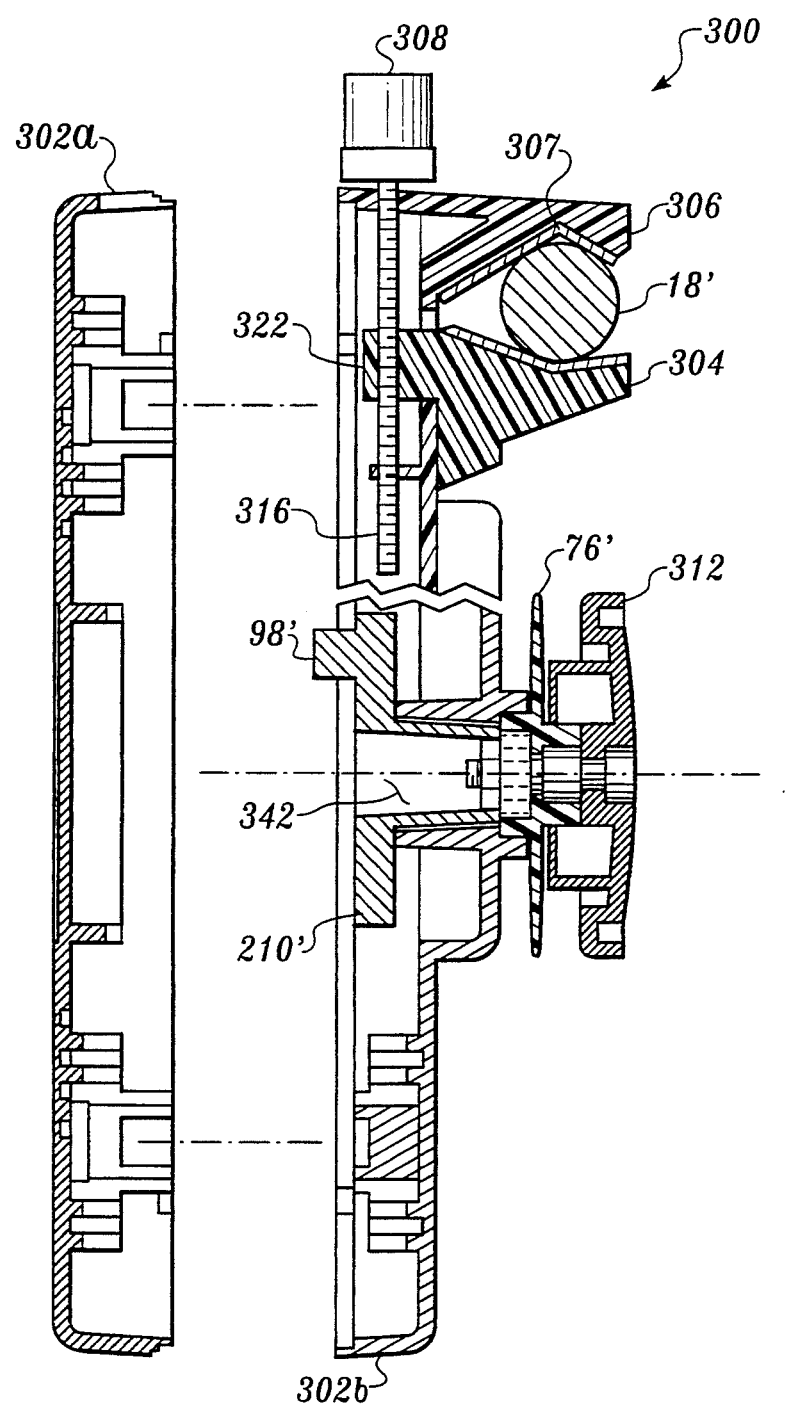
FIG. 19 is a side sectional view of the air pump of FIG. 13 taken along section line 12—12.

Air pump 300 is mounted to bicycle 12' by rotating knob 308 counter-clockwise until there is a sufficiently large gap between hook portion 306 and mandible 304 to receive chain stay 18', and positioning air pump 300 so that chain stay 18' is received therein. Then knob 308 is rotated clockwise, moving mandible 304 upwardly, until chain stay 18' is clamped snugly between hook portion 306 and mandible 304. Preferably, a resilient cushioning insert 307, is fitted within the interior of hook portion 306 facing chain stay 18' so as to provide a yielding grip when chain stay 18' is clamped between hook portion 306 and mandible 304. Cushioning insert 307 is also seen in FIG. 19. Cushioning insert 307 reduces the risk of damage to chain stay 18' and the interior of hook portion 306 facing chain stay 18', and may comprise any suitable resilient material, such as polyurethane foam, synthetic or natural rubber, or the like. A similar cushioning insert 309 is also preferably fitted to the surface area of mandible 304 facing chain stay 18'.

Once air pump 300 is mounted to bicycle 12', crank assembly 20' of bicycle 12' may be rotated as previously described in connection with the first embodiment, to rotate drive sprocket 76', thereby operating the pump mechanism enclosed in housing 302. Referring to FIG. 12, the operation of the pump mechanism causes compressed air to be injected through air hose 50', extending outwardly from air pump 300, through inflation valve 52' and into bicycle tire 54' to inflate it.

A feature of air pump 300 not present in air pump 10, is a chain retainer plate 312, readily visible in FIGS. 13 and 19. Chain retainer plate 312 is disc-shaped, having a diameter substantially equal to that of drive sprocket 76', and is centrally mounted to the side of drive sprocket 76', opposite the housing 302. Chain retainer plate 312 assists in keeping drive chain 30' in engagement with drive sprocket 76'.

Figure 14:
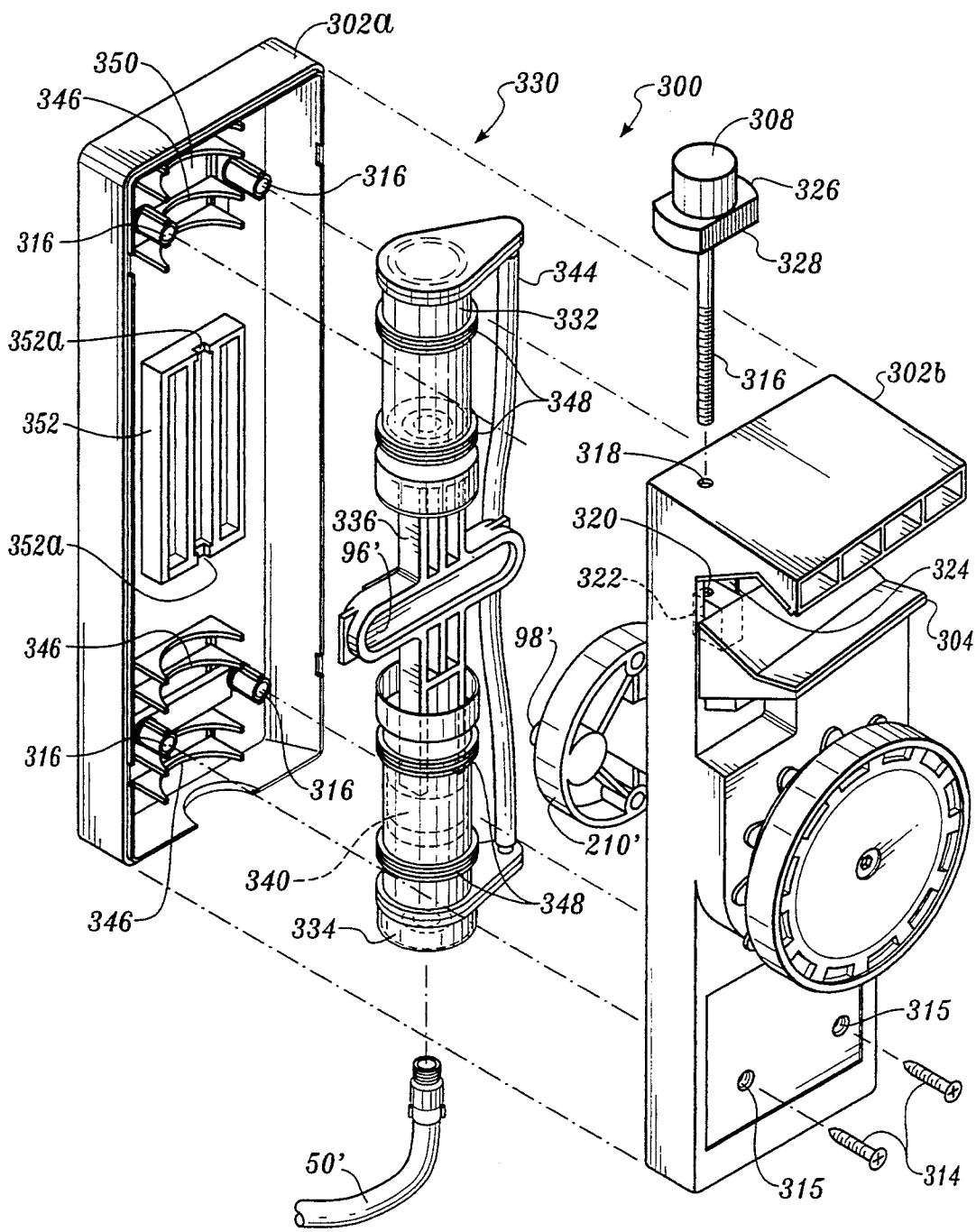
FIG. 14 is an exploded isometric view of the air pump of FIG. 12.

As shown in FIG. 14, a front case section 302a mates with a rear case section 302b, and case sections 302a and 302b are held together by four fasteners 314 (only one of which is shown) that pass through rear case section 302b and into front case section 302a, through four holes 315. Housing 302 may be formed of the same material as housing 40 of air pump 10.

Knob 308 has a threaded rod 316 centrally mounted to its bottom surface and extends through a hole 318 defined in the upper surface of rear case section 302b into rear case section 302b. The end of threaded rod 316, opposite knob 308, threads into a hole 320 defined in a tang 322 that projects from mandible 304 into rear case section 302b. A vertical slot 324 is formed in the upper portion of rear case section 302b, through which tang 322 extends into the interior of housing 302. The end of tang 322 opposite rear case section 302b is attached to mandible 304. Threaded rod 316 is shown threaded through tang 322 in FIG. 19.

Referring again to FIG. 14, rotation of knob 308 causes threaded rod 316 to engage threaded hole 320 in tang 322, thereby causing vertical movement of mandible 304 along vertical slot 324. Knob 308 includes a rounded portion 326 to permit the operator's fingers to rapidly rotate knob 308, causing vertical movement of mandible 304. Positioned below rounded portion 326 on knob 308 is a serrated flattened section 328. Serrated flattened portion 328 permits the operator to engage knob 308 with a wrench or other suitable tool to apply additional rotative torque to knob 308 if knob 308 is too difficult to adequately finger tighten. Serrated flattened portion 328 also provides greater leverage for the use of one's fingers because serrated flattened portion 328 has a length greater than the diameter of rounded portion 326 of knob 308.

Visible in FIG. 14 is a pump mechanism indicated generally at reference numeral 330. Pump mechanism 330 includes cylinder sleeves 332 and 334 that are arranged in opposition to one another along a common longitudinal axis. Positioned between cylinder sleeves 332 and 334 along the common longitudinal axis is a double-ended piston rod 336. Double-ended piston rod 336 includes piston heads 338 and 340, that are received in cylinder sleeves 332 and 334, respectively. Defined centrally in double-ended piston rod 336 between piston heads 338 and 340 is a central bearing slot 96', in which the longitudinal axis of the slot 96' is generally perpendicular or transverse to the longitudinal axis of piston rod 336. Bearing slot 96' receives a crank pin 98', which is mounted eccentrically, that is, proximate the periphery of a crank wheel 210'.

As shown in FIG. 19, crank wheel 210' mounts to an axle 342 at the central axis of crank wheel 210'. Axle 342 extends from crank wheel 210' in the interior of the housing 302 through rear case section 302b to drive sprocket 76', which is mounted at its central axis to axle 342. Thus, rotation of drive sprocket 76' causes crank wheel 210' to rotate at the same angular rate. Returning to FIG. 14, rotation of the crank wheel 210' drives crank pin 98' in bearing slot 96' to produce translational, reciprocating motion of double-ended piston rod 336, as described previously in connection with the first preferred embodiment. Also as described in the first embodiment, movement of a piston head 338 or 340 into the interior of a cylinder sleeve 332 or 334, respectively, comprises a compression stroke with respect to that cylinder sleeve, and movement of the piston head in the opposite direction; i.e., withdrawing the piston head from the cylinder sleeve comprises an intake stroke.

In the second preferred embodiment, air compressed in the upper cylinder sleeve 332 during a compression stroke (corresponding to an intake stroke in the lower cylinder sleeve 334), as described in regard to the first preferred embodiment, travels through tube 344 that connects cylinder sleeves 332 and 334 in fluid communication to cylinder sleeve 334. However, the compressed air traveling through tube 344 to the lower cylinder sleeve 334, encounters a one-way valve, described infra, that prevents the compressed air from entering the interior portion of cylinder sleeve 334 surrounding piston head 340 from the manifold. Hence, the compressed air from tube 344 is exhausted through air hose 50' that attaches to the lower surface of cylinder sleeve 334. During a compression stroke in the lower cylinder sleeve 334, which corresponds to an intake stroke in the upper cylinder sleeve 332, compressed air from the lower cylinder sleeve 334 does not flow through tube 344, because it encounters an identical one-way valve in the upper cylinder sleeve 332. Thus, this compressed air also exhausts through air 50', attached to the lower surface of cylinder sleeve 334.

Double-ended piston rod 336 and the piston heads 338 and 340 preferably comprise the same material as double-ended piston rod 90 described in the first embodiment. However, the cylinder sleeves 332 and 334 are preferably constructed of a plastic material resistant to heat, such as a material sold under the trademark ALTEM ™, which is manufactured by General Electric Co. Preferably, the plastic material comprising the cylinder sleeves is resistant to a temperature of at least 250° F., and even higher temperatures. The reason that a temperature-resistant plastic is required is because the compression of air within cylinder sleeves 332 and 334 increases the temperature of the air sufficiently to melt many conventional plastic materials.

There are three primary reasons that the cylinder sleeves 332 and 334 are made of a plastic material in air pump 300, rather than metal as in the first embodiment. First, a metal cylinder sleeve must be precisely machined and polished to obtain a good seal between the piston head and the interior walls of the cylinder sleeve. Unfortunately, precise machining and polishing is difficult and therefore expensive to achieve. In contrast, a plastic material can be precisely injection-molded to form the cylinder sleeve, eliminating the need for precise machining and polishing, thereby reducing cost, while still obtaining a good seal between the piston heads 338 and 340 in the interior of the cylinder sleeves 332 and 334.

Second, cylinder sleeves and manifolds made of a plastic material may be manufactured as an integral injection molded configuration, rather than requiting that a number of separate parts be joined together in a hermetically sealed assembly as with the metal cylinder sleeves and manifold components of the first embodiment. As will be described infra, cylinder sleeves 332 and 334 require only a simple insertion of an elastomeric band and ultrasonic welding of a plastic cylinder head to complete each cylinder/manifold. Thus, assembly costs are reduced.

Third, material costs are reduced because plastic is cheaper than metal. Also, plastic material is generally lighter than a comparable metal component; and weight is an important consideration for an item that may be carried on a bicycle. The principal problem to be overcome before using a plastic material for cylinder sleeves 332 and 334 in air pump 300, is that, as stated previously, the plastic material must be resistant to elevated temperatures.

The cases sections 302a and 302b are also injection molded. Cylinder sleeves 332 and 334 are precisely positioned in housing 302 by ribs 346 on the interior of each case section 302a and 302b, because ribs 346 can readily be injected mold at the proper position. In turn, positioning rings 348 on the outer periphery of cylinder sleeves 332 and 334 slip between ribs 346 to precisely position the cylinder sleeves 332 and 334 within the housing 302. Positioning rings 348 are also visible in FIGS. 17 and 18. The ribs 346 and the positioning rings 348 are injection molded integral with each case section 302a and 302b, and with the cylinder sleeves 332 and 334, respectively, so that the foregoing items may be precisely positioned without requiting machining, jigs, or careful adjustment.

A slot 350 is formed between each rib 346 on front case section 302a that leads to the exterior of the housing 302. Slots 350 provide ventilation to the interior of housing 302 to dissipate heat generated by the compression of air within cylinder sleeves 332 and 334. Proper ventilation is important in air pump 300 because the cylinder sleeves 332 and 334 are made of a plastic material that does not conduct heat, as well as a metal material, of which the cylinder sleeves were made in the first embodiment. Thus, slots 350, which are visible on the exterior of the front of air pump 300 in FIG. 12, provide additional ventilation and cooling.

Also injection molded into the interior of front case section 302a is a rectangular guide 352. Rectangular guide 352 projects centrally and runs lengthwise along the interior surface of front case section 302a. Formed centrally at opposite vertical ends of rectangular guide 352 are two rectangular slots 352a. Rectangular slots 352a receive a rectangular rail 353, shown in FIGS. 15 and 16, that runs lengthwise, centrally along the front of piston rod 336.

Referring to FIG. 14, when rectangular slots 352a receive rectangular rail 353 (visible in FIGS. 15 and 16) the surfaces of rectangular guide 352 bear against plate 353a (also visible in FIGS. 15 and 16) that is mounted lengthwise in front of bearing slot 96'. Rectangular guide 352 bearing against plate 353a serves to ensure that the longitudinal axis of bearing slot 96' remains generally perpendicular to the central axis of crank pin 98'. As can be seen in FIG. 14, piston rod 336 is trapped between rectangular guide 352 and crank pin 98' on crank wheel 210'. Thus, rotation of crank wheel 210' causes crank pin 98' to act upon bearing slot 96', causing the piston rod 336 to reciprocate. As the piston rod 336 reciprocates, rectangular rail 353 slides within rectangular slots 352a, while the surface of rectangular guide 352 bears against plate 353a. Hence, piston rod 336 is precisely maintained in a centered position within each of the cylinder sleeves 333 and 334, while reciprocating vertically.

Figure 15:
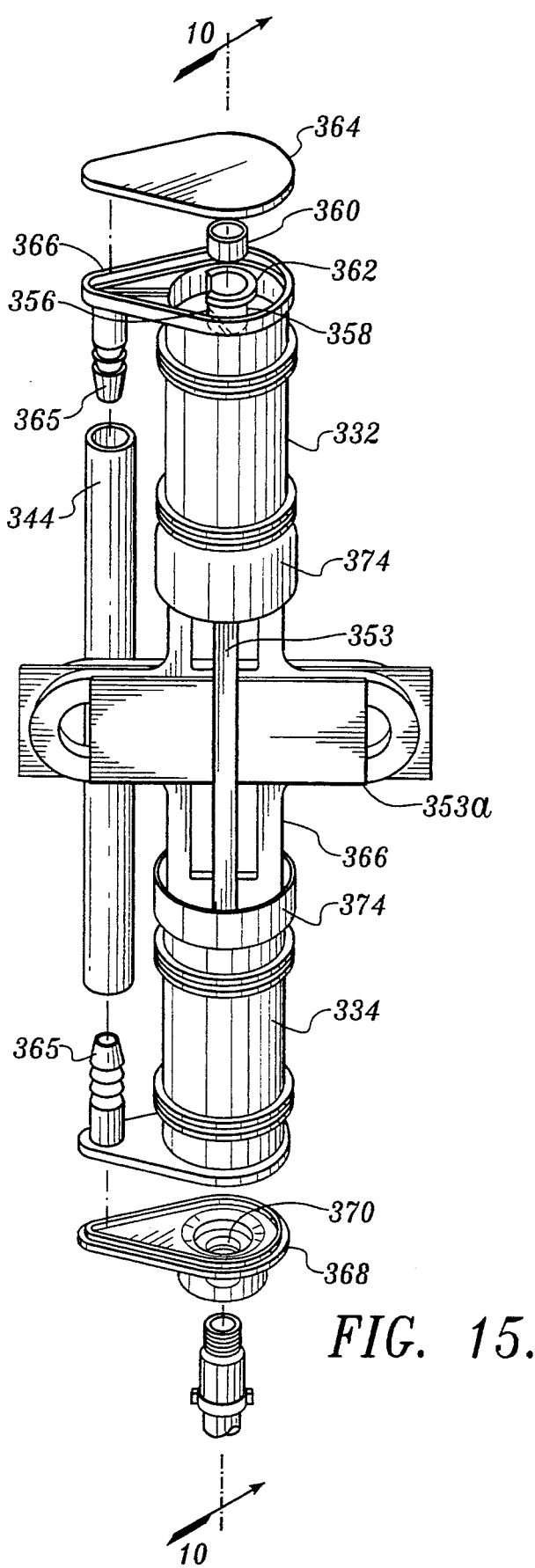
FIGS. 15 and 16 are exploded isometric representations of some of the cylinders, pistons, and drive components of the air pump of FIG. 12.
Figure 18:
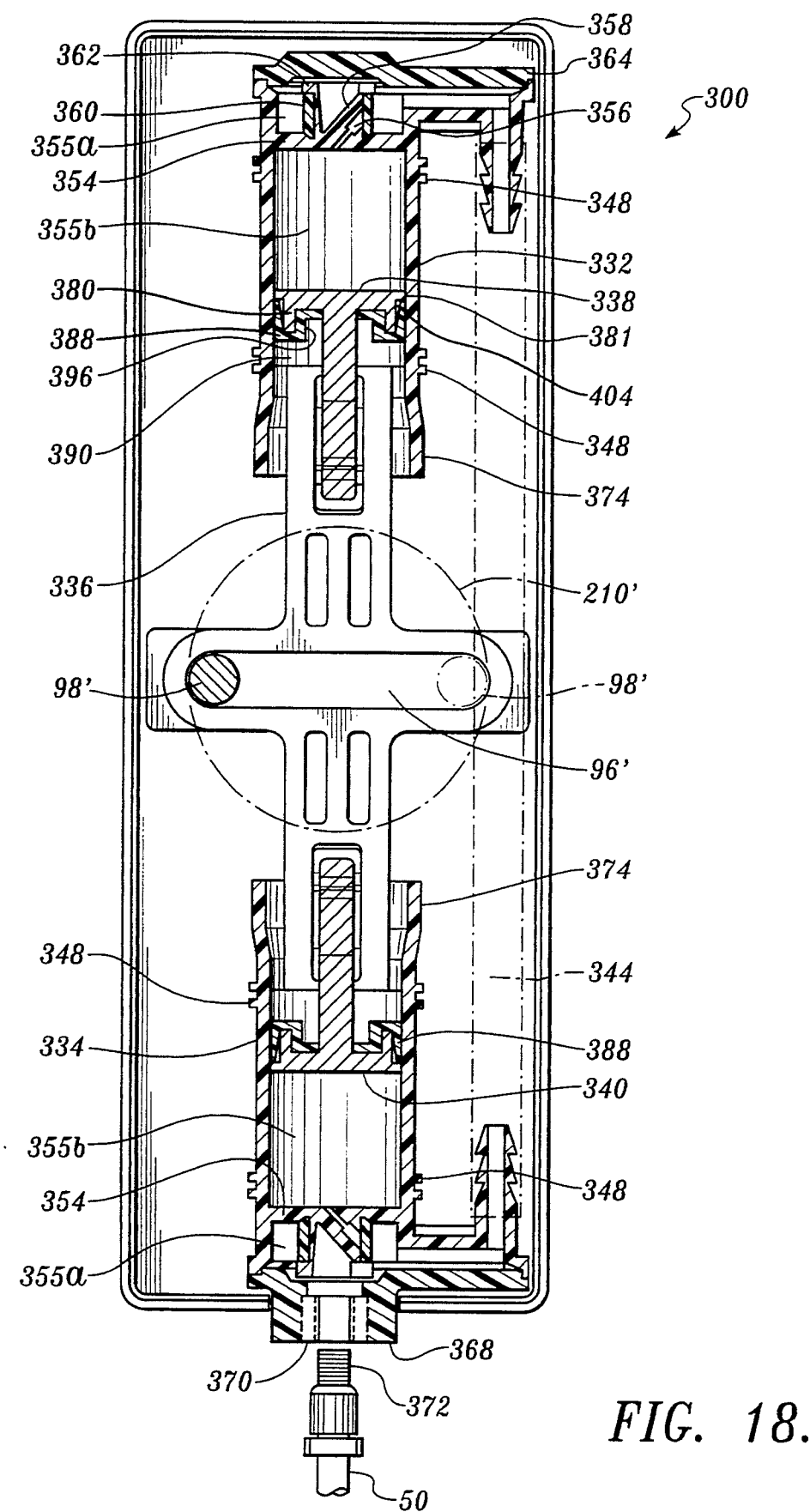
FIG. 18 is a rear elevational sectional view of the air pump of FIG. 13 taken along section line 11—11.

As shown in FIGS. 15 and 18, upper cylinder sleeve 332 is capped at the end opposite piston rod 336 by a cylinder head 364. As evident in FIG. 18, a wall 354 in the interior of cylinder sleeve 332 divides the upper cylinder sleeve 332 into a cylinder head region 355a and a piston head region 355b. Cylinder head region 355a is disposed adjacent the cylinder head 364, and piston head region 355b receives piston head 338. A passage 356 connects cylinder head region 355a in fluid communication with piston head region 355b. Thus, air compressed in piston head region 355b during a compression stroke passes through passageway 356 into cylinder head region 355a.

A cylindrical projection 358 extends generally vertically from the upper surface of wall 354. Passageway 356 extends through cylindrical projection 358, at an angle between vertical and horizontal, and passes from an opening in the side of cylindrical projection 358 through wall 354.

A cylindrically shaped elastomeric band 360 is slid over cylindrical projection 358 and has a slightly smaller diameter than the cylindrical projection, so that the elastomeric band 360 is under tension when in place on cylindrical projection 358. Furthermore, elastomeric band 360 is of sufficient length so as to cover the opening to passageway 356, as can be seen in FIG. 18.

The closed end of cylindrical projection 358 includes an annular lip 362, which has a diameter slightly larger than cylindrical projection 358, as best seen in FIG. 15. Thus, the periphery of annular lip 362 projects beyond the outer periphery of cylindrical projection 358. The annular lip overhangs elastomeric band 360 when the elastomeric band 360 is in place on the cylindrical projection 358, as can be seen in FIG. 18, to retain the elastomeric band 360 in place upon the cylindrical projection 358.

Cylindrical projection 358 includes a crescent-shaped relieved section adjacent to the opening to passageway 356 as illustrated in FIG. 15. Accordingly, annular lip 362 does not overhang the elastomeric band 360 at the periphery of cylindrical projection 358 immediately adjacent to the opening into passageway 356.

In operation, air compressed in the piston head region of cylinder sleeve 332 during a compression stroke exerts pressure upon the elastomeric band through passageway 356, forcing the elastomeric band 360 to expand slightly, permitting airflow out of cylinder sleeve 332 until the pressure equalizes within the cylinder head and piston head regions 355a, 355b of cylinder sleeve 332. If the air pressure is greater in the piston head region 355b of cylinder sleeve 332, the air flows from passageway 356 through the relieved crescent section of cylindrical projection 358.

During an intake stroke in cylinder sleeve 332, however, elastomeric band 360 contracts back snugly into place around cylindrical projection 358, substantially sealing the entrance to passageway 356. Thus, the greater pressure in the cylinder head region 355a of cylinder sleeve 332 only serves to press the elastomeric band 360 firmly into place around cylindrical projection 358, more tightly sealing the entrance to passageway 356. Hence, passageway 356, in combination with cylindrical projection 358 and elastomeric band 360 serves as a one-way valve. That is, during a compression stroke in cylinder sleeve 332, compressed air may flow out of piston head region 355b of cylinder sleeve 332 into cylinder head region 355a through passageway 356. However, during an intake stroke in cylinder sleeve 332, air is prevented from flowing from cylinder head region 355a of cylinder sleeve 332 into piston head region 355b, despite any greater pressure in cylinder head region 355a relative to piston head region 355b.

Generally, a pressure that is 7 to 10 psi greater in the piston head region 355b of cylinder sleeve 332 is sufficient to cause the elastomeric band 360 to expand, and allow the pressure to equalize (within the range of 7 to 10 psi) in the cylinder head and piston head regions 355a and 355b of cylinder sleeve 332 in the second preferred embodiment. It will be readily apparent to those skilled the art, that cylindrical projection 358 may also have other geometric shapes rather than cylindrical, such as an oval shape. The critical feature is that the elastomeric band has a smooth surface to seal the entrance to passageway 356, until a sufficiently greater pressure in the piston head region 355b of upper cylinder sleeve 332, relative to the cylinder head region 355a, forces compressed air past the seal.

It should be noted that the radially outer end of passageway 356 is relieved relative to its radially inner end. That is, the end of passageway 356 opening into cylinder head region 355a has a significantly greater diameter than the end of passageway 356 opening into the piston head region 355b. Air compressed within cylinder sleeve 332 has a significantly elevated temperature. The temperature of the compressed air is such that it may degrade properties of elastomeric band 360. Therefore, the portion of internal passageway 356 nearest the elastomeric baud 360 is relieved so that the compressed air will expand slightly, and thus its temperature will be reduced as it flows through passageway 356.

Passageway 356 has specific advantages over T-shaped exhaust passage 134 of the first embodiment. First, passageway 356 contains a reduced volume of air relative to T-shaped exhaust passage 134, so that there is reduced dead-air space in cylinder sleeves 332 and 334, thereby increasing the efficiency of a compression stroke within each cylinder sleeve. Additionally, passageway 356 does not contain any 90 degree turns, unlike T-shaped exhaust passage 134, so that the air flows through passageway 356 with a higher velocity during a compression stroke. The higher velocity air increases the efficiency of the one-way valve function of passageway 356 by forcing more of the air out of a cylinder sleeve 332 or 334 during a compression stroke, before the elastomeric band 360 flexes back into place, sealing passageway 356.

In FIG. 15 it can be seen that cylinder head region 355a of cylinder sleeve 332 extends laterally in a V-shaped projection 366, wherein the vertex of the V forms the radially outer end. Projecting transversely to the V-shaped projection from a position proximate to its vertex is a nipple 365, over which a tube 344 is fitted, as best seen in FIG. 18. Accordingly, compressed air flowing from piston head region 355b of cylinder sleeve 332 into cylinder head region 355a flows through nipple 365 into a tube 344.

The opposite end of tube 344 slides snugly over a corresponding nipple 365 on lower cylinder sleeve 334, which is substantially identical to upper cylinder sleeve 332 with two primary exceptions. First, lower cylinder sleeve 334 is rotated 180°, so that lower cylinder sleeve 334 mirrors upper cylinder sleeve 332. Thus, a compression stroke in upper cylinder sleeve 332 corresponds to an intake stroke in lower cylinder sleeve 334, and vice versa, as described in the first embodiment. Second, cylinder head 368 that caps the lower cylinder sleeve 334, has a hole 370 defined therethrough, generally along the common longitudinal axis with which cylinder sleeves 332 and 334 are aligned. Hole 370 is internally threaded and receives a threaded end 372 of air hose 50'.

Thus, during a compression stroke within upper cylinder sleeve 332, compressed air flows from piston head region 355b of cylinder sleeve 332, through passageway 356, into cylinder head region 355a of cylinder sleeve 332, and through tube 344 into lower cylinder sleeve 334. There, the compressed air enters cylinder head region 355a of lower cylinder sleeve 334, but is prevented from entering piston head region 355b of lower cylinder sleeve 334 by an elastomeric band 360 fitted around a cylindrical projection 358, identical to those same components in upper cylinder sleeve 332. Therefore, the compressed air exhausts through air hose 50' connected to hole 370 in lower cylinder head 368.

During a compression stroke within lower cylinder sleeve 334, which corresponds to an intake stroke within cylinder sleeve 332, compressed air from within lower cylinder sleeve 334 in tube 344 is prevented from entering cylinder sleeve 332 by elastomeric band 360 on cylindrical projection 358 of upper cylinder sleeve 332. Thus, the compressed air from lower cylinder sleeve 334 also exhausts through air hose 50' connected to hole 370 in the lower cylinder head 368.

Skirts 374, which are portions of each cylinder sleeves 332 and 334 that are nearest one another along the common longitudinal axis of cylinder sleeves 332 and 334, flare outwardly, as seen in FIGS. 15 and 18. That is, skirt portion 374 of each cylinder sleeve 332 and 334 has a significantly wider diameter than the main body of each cylinder sleeve. The purpose of the skirts is to facilitate insertion of the piston heads into the cylinder sleeves. In addition, when a piston head 338 or 340 moves to a location within skirt 374 of cylinder sleeve 332 or 334, respectively, there is a gap between the outer periphery of piston head 338 or 340 and the inner periphery of skirt 374. Thus, when piston head 338 or 340 is within a skirt 374, air can flow from the ambient environment into cylinder sleeve 332 or 334, respectively, through this gap, to be compressed by piston head 338 or 340, after the piston head 338 or 340 moves out of the skirt 374 and into cylinder sleeves 332 or 334, respectively.

Skirt 374 in the second preferred embodiment is advantageous over intake ports 106 and 108, which were described in the first embodiment, for two reasons. First, skirt 374 defines a substantially larger area through which air may be drawn into a cylinder than does port 106 or 108. With regard to skirt 374, air may be drawn in from all around the periphery of the cylinder. In contrast, with regard to port 106 or 108, air may only be drawn in through the portions of the cylinder that are relieved to form the port. Increasing the area through which air may be drawn into a cylinder during an intake stroke increases the efficiency of the pumping mechanism. Second, the larger diameter skirt 374 greatly facilitates assembly of air pump 300. Principally, it is remarkably easier and more efficient to insert piston head 338 or 340 through the larger diameter skirt 374 into each cylinder sleeve 332 or 334, respectively, compared to the effort required to assemble the piston heads and cylinder sleeves of the first embodiment.

Figure 16:
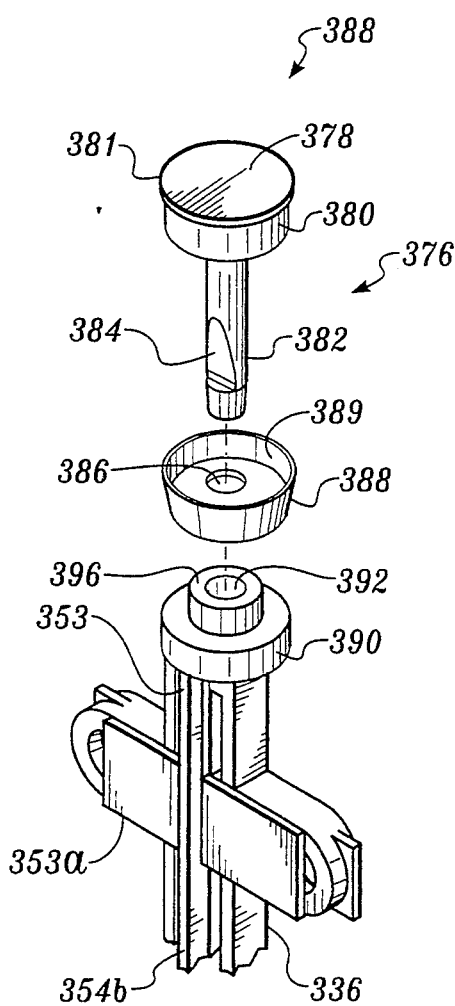

FIG. 16 illustrates part of piston rod 336. As both ends of piston rod 336 are identical, only the end of piston rod 336, including piston head 338, is shown in FIG. 16. Piston head 338 includes a cap 376 disposed at the distal end of the piston head 338. Cap 376 includes a first portion 378 having a substantially circular cross-sectional area, and a second portion 380 centrally mounted to the portion 378, with a substantially circular cross-sectional area of a diameter smaller than the first portion 378 so that a lip 381 is formed between first portion 378 and second portion 380. Centrally mounted to the proximal side of cap 376 is a rod 382, with a notch 384 formed near the proximal end of rod 382. Rod 382 passes through a circular hole 386, defined centrally through a frustoconically-shaped flexible seal 388.

Figure 17:
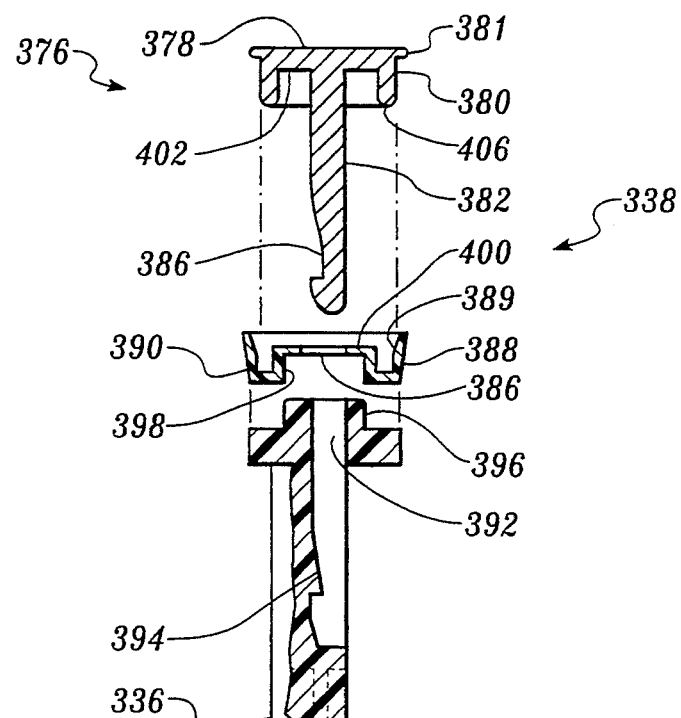
FIG. 17 is an exploded sectional view of one of the cylinders and pistons shown in FIG. 15 taken along section line 10—10.
Figure 17:
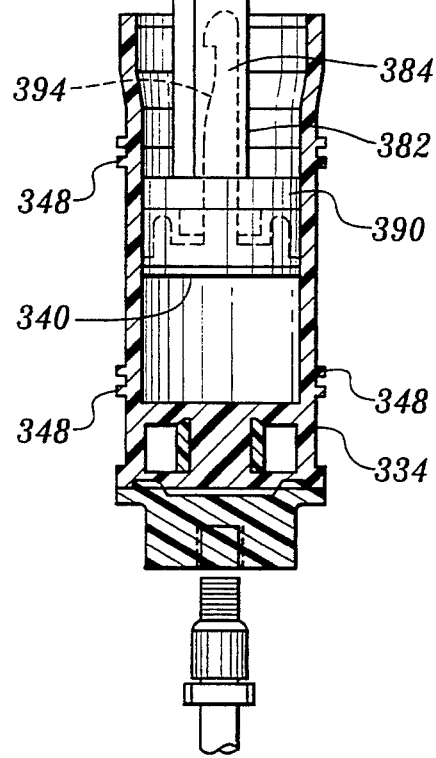

FIG. 17 shows piston rod 336 and piston head 338. Defined within seal 388 is an annular groove 389 facing a piston cap 376, that receives an annular ridge 380 that projects downwardly from piston cap 376. When rod 382 is fully inserted through circular hole 386 of seal 388, annular ridge 380 of piston cap 376 fits within the facing annular groove 389 of seal 388, so that the outer periphery of annular ridge 380 is surrounded by seal 388, best seen in FIG. 18. However, the lip formed between larger diameter portion 378, and annular ridge 380 of piston cap 376, is not surrounded by seal 388.

Returning to FIG. 17, mounted to the end of piston rod 336 nearest flexible seal 388, is a round stem 390. Defined centrally through stem 390 is a circular-shaped hole 392. Rod 382 of piston head 338 passes through flexible seal 388, and then through circular hole 392 of stem 390 into the interior of piston rod 336.

Shown in FIG. 17 is a tang 394 defined within the interior of piston rod 336. When rod 382 is fully inserted through fitting 390 into the interior of piston rod 336, tang 394 engages a notch 384 of piston rod 336, holding rod 382 in place. In FIG. 17, piston head 340 is illustrated as fully assembled within lower cylinder sleeve 334. As previously described, piston head 340 is substantially identical to piston head 338. Thus, as evident in FIG. 17, notch 384 of rod 382 fully engaging tang 394 of piston rod 336.

When rod 382 is being held in place by engagement with tang 394 of piston rod 336, rod 382 is under tension. Thus, flexible seal 388 is held compressed between piston cap 376 and stem 390 at each end of piston rod 336. Moreover, as can be observed in FIG. 17, the diameter of stem 390 is substantially equal to the diameter of the adjacent side of flexible seal 388, and a smaller diameter circular-shaped projection 396 projects centrally from stem 390. Circular-shaped projection 396 has a diameter approximately the same as the diameter of a circular-shaped depression 398 defined in the underside of flexible seal 388 adjacent stem 390. Thus, stem 390 on the end of piston rod 336 mates snugly with the adjacent side of flexible seal 388, when flexible seal 388 is held compressedly against fitting 390.

A similar arrangement exists on the opposite side of seal 388, adjacent piston cap 376. Specifically, a circular projection 400 within annular groove 389 of seal 388 is opposite a complementary shaped cylindrical depression 402 on the facing side of piston cap 376. Thus, when rod 382 forces piston cap 376 compressedly against flexible seal 388, circular projection 400 fits snugly within cylindrical depression 402.

As can be seen in FIG. 18, when a piston head 338 or 340 is inserted into a cylinder sleeve 332 or 334, the outer periphery of seal 388 contacts the inner surface of the main body portion of a cylinder sleeve 332 or 334. Also, the outer periphery of lip 381 contacts the inner surface of cylinder sleeve 332 or 334. Notwithstanding, there is a circular wedge-shaped gap 404 formed between the inner periphery of seal 388 and the outer periphery of the annular ridge 380 of piston cap 376, immediately below lip 381, as evident in FIG. 18. The purpose of gap 404 is as follows. When a piston head 338 or 340 is compressing air within a cylinder sleeve 332 or 334, respectively, compressed air works its way into gap 404, urging flexible seal 388 outwardly, thereby causing the peripheral annular tip of flexible seal 388 to contact the inner surface of cylinder sleeves 332 or 334 with greater force, preventing the escape of air past piston head 338 or 340.

However, when piston head 338 or 340 is moving towards skirt portion 374 of a cylinder sleeve 332 or 334 the annular tip of flexible seal 388 flexes inwardly, reducing the extent of gap 404, so that the annular tip of flexible seal 388 contacts the inner surface of each cylinder sleeve with a reduced force. Thus, air may escape past a piston head 338 or 340 into the interior of the cylinder sleeve. Hence, as will be readily appreciated by those skilled in the art, the force required to withdraw piston head 338 or 340 from cylinder sleeve 332 or 334, respectively, is reduced. The foregoing arrangement of the seal 388 and piston cap 376 is known in the art as a "U-cup seal."

An additional feature of the foregoing U-cup seal arrangement is that annular ridge 380 of piston cap 376 is rounded to form a ring 406, shown in FIG. 17. Ring 406 has a reduced cross section relative to the main body of annular ridge 380 of piston cap 376; thus, when piston cap 376 is held compressedly against seal 388 by the tension force in rod 382, ring 406 is compressed against seal 388 with a greater pressure (force/area) because of its reduced cross-sectional area. The greater pressure produced by ring 406 serves to form an improved seal between piston cap 376 and seal 388.

The movement of piston heads 338 and 340 within cylinder sleeves 332 and 334 is preferably facilitated by applying a silicon-based grease resistant to temperatures of at least 250° F. Because the compression of air within the pumping mechanism 330 and friction serves to increase temperatures within air pump 300, the lubricant must have good heat-resistive qualities. Moreover, the lubricant must not degrade the plastic material comprising cylinder sleeves 332 and 334, piston rod 336 and piston heads 338 and 340. The same lubricant may also be applied to bearing slot 96', to facilitate motion of the crank pin 98' within bearing slot 96' and to rectangular guide 352 and slots 352a and 352b to facilitate movement of plate 353a and rail 353 in sliding contact with the plate and slots.

As can be seen in FIG. 18, the top of each piston head 338 and 340 is substantially planar. Additionally, the wall 354 in each cylinder sleeve 332 and 334 facing each piston head 338 and 340 has a complementary, substantially planar shape. The way in which reciprocating force is applied to piston rod 336 is substantially the same as described in the first embodiment. Namely, crank pin 98' moves circularly within housing 302 due to the rotation of crank wheel 210'. Crank pin 98' exerts a reciprocating force upon bearing slot 96' and piston rod 336, as the crank pin moves back and forth within bearing slot 96'. In FIG. 18, the extreme position of piston head 340 during a compression stroke is indicated in phantom. When piston head 340 is in the phantom position shown, piston head 338 would be located within the skirt 374 of cylinder sleeve 332. Motion of crank pin 98' relative to the bearing slot 96' is indicated by showing a second position of the crank pin 98' in phantom. The phantom position of the crank pin 98' occurs when crank wheel 210' has rotated 180°, or an integer multiple thereof, from the position where the crank pin is presently shown.

In the worst case scenario, as shown in FIG. 18, each piston head 338 and 340 may contact wall 354 of cylinder sleeves 332 or 334, respectively (at opposite ends of each stroke). However, nominally there is a slight clearance between the top of each piston head 338 and 340 and wall 354, of up to 0.005 of an inch during peak compression of air within a cylinder sleeve 332 or 334. The close tolerance of each piston head 338 and 340 with the wall 354 of each cylinder sleeve 332 and 334, substantially expels all of the air within the corresponding cylinder sleeve to provide an efficient compression stroke.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for pumping air using a bicycle having a frame, a crank assembly rotatably mounted to said frame, a wheel rotatably mounted to said frame, a free wheel gear cluster attached to said wheel for rotating said wheel when said gear cluster is caused to rotate in a forward direction and for rotating independently of said wheel when said gear cluster is rotated in a reverse direction, and a drive chain having upper and lower chain runs interconnecting said crank assembly and said free wheel gear cluster and extending along upper and lower paths, respectively, said method comprising the steps of:

(a) providing an air pump having a housing that includes a drive sprocket and pumping means for pumping air in response to rotation of said drive sprocket;

(b) positioning said air pump proximate said drive chain so that said air pump is stationary relative to said bicycle;

(c) moving a selected one of said upper and lower runs of said drive chain substantially away from its respective path and engaging said selected one of said runs with said drive sprocket;

(d) maintaining the engagement of said drive chain with said drive sprocket with a chain retainer mounted to said drive sprocket; and (e) rotating said crank assembly and said free wheel gear cluster in a reverse direction so that said selected one of said runs moves past said drive sprocket so as to rotate said drive sprocket, whereby said pumping means of said stationary air pump is operated while said wheel of said bicycle remains stationary.

2. The method as in claim 1, wherein said lower chain run extends through a chain tensioning device, and said step of moving a selected one of said upper and lower runs, further comprises moving said lower chain run away from its path and engaging said lower chain run with said drive sprocket on said air pump so as to substantially deflect the chain tensioning device to a forward position, thereby placing the lower chain run in tension between said chain tensioning device and said drive sprocket during rotation of said free wheel cluster in a reverse direction.

3. The method of claim 1, wherein said air pump includes a finger-operated clamp, and the step of positioning said air pump proximate said drive chain further comprises mounting said air pump to the frame of said bicycle with finger-operated clamp so that said air pump is stationary relative to said frame and may be quickly and easily detached from said frame.

4. The method as in claim 3, wherein said finger-operated clamp includes a jaw, a threaded rod, an oppositely facing mandible that is movable in response to rotation of the threaded rod, and a knob that is connected to the threaded rod and rotatable in a first direction and in a second direction, said mandible being linearly translatable towards said jaw in response to rotating said knob in said first direction, and linearly translatable away from said jaw in response to rotating said knob in said second direction, wherein the step of mounting said air pump to said frame of said bicycle comprises the steps of:

(a) rotating said knob in said second direction until said mandible linearly translates away from said jaw sufficiently so that said pump may be positioned relative to said bicycle with a portion of said frame between said jaw and said mandible; and (b) rotating said knob in said first direction until said mandible linearly translates towards said jaw until said portion of said frame is clamped between said jaw and said mandible.

5. The method as in claim 4, wherein said knob includes a plurality of flattened regions adapted to engage a tool for increasing a rotative torque that may be applied to said knob, and a round portion; wherein the step of mounting said air pump to said frame of said bicycle further comprises the steps of:

(a) rotating said knob in said first direction using the round portion so that said mandible linearly translates towards said jaw until said portion of said frame is clamped between said jaw and said mandible, and said knob is finger-tight; and (b) using a tool to engage said plurality of flattened regions of said knob, further rotating said knob in said first direction with said tool until said portion of said frame is clamped more firmly between said jaw and said mandible by further linear translation of said mandible towards said jaw.

6. The method of claim 1, wherein said pumping means pumps air in response to said rotation of said crank assembly and said free wheel gear cluster in said reverse direction, while said rear wheel remains stationary.

7. The method of claim 1, wherein said pumping means provides compressed air, and said step of providing an air pump includes the steps of:

(a) providing a one-way valve through which said compressed air passes, said one-way valve having a passage that has a first portion and a second portion, wherein said compressed air flows from said first portion into said second portion and said second portion has a substantially larger cross-sectional area than said first portion; and (b) cooling said compressed air from said pumping means by expansion of said compressed air as it flows from the first portion into the second portion of the passage.

8. An air pump designed for use with a bicycle having a frame, a first elongate tube, a wheel rotatably mounted to the frame, a crank assembly rotatably mounted to the frame, at least one gear attached to the wheel, the at least one gear being designed to cause the wheel to rotate in a first direction when the gear is driven in the first direction, a drive chain having a length and tension selected so that the chain engages and couples the crank assembly with the at least one gear so as to transmit rotational drive from the crank assembly to the at least one gear when the crank assembly is caused to rotate, the drive chain including first and second runs extending along upper and lower paths, respectively, disposed adjacent the first elongate tube, the air pump comprising:

(a) a housing having a hollow interior;

(b) clamp means mounted to said housing, for releasably securing said housing to a selected portion of the first tube so as to permit said housing to be quickly secured to and quickly detached from the first tube;

(c) a sprocket rotatably mounted to said housing in a fixed, predetermined spaced-apart relation to said clamp means, said sprocket being adapted to engage and be rotatably driven by the drive chain, wherein said sprocket is sized and said predetermined spaced-apart relation is selected so that when said housing is secured to the first tube and one of the first and second runs of the chain is engaged with said sprocket, said one run of chain will be deflected from its respective path to an extent sufficient to increase the tension in the chain such that said one run is maintained in driving engagement with said sprocket when the chain is driven by the crank assembly;

(d) a chain retainer centrally mounted to the sprocket, sized to maintain the chain in driving engagement with said sprocket; and (e) pump means, positioned in said interior of said housing and coupled with said sprocket, for providing compressed air in response to rotation of said sprocket.

9. The pump according to claim 8, further comprising a lubricant for the pump means that is resistant to a temperature of at least 300° F.

10. The pump according to claim 8, wherein said pump means include:

(a) at least one cylinder sleeve mounted in said interior of said housing; and (b) a piston rod having a piston head mounted in said at least one cylinder sleeve so that said piston head is driven in a first direction constituting an intake stroke and in a second direction constituting a compression stroke, so that air drawn into in said at least one cylinder sleeve during the intake stroke is compressed during said compression stroke.

11. The pump according to claim 10, wherein a top surface of the piston head and an adjacent facing surface wall within said cylinder sleeve are complementary in shape, such that as said piston completes its compression stroke, substantially all of the air trapped in the volume in said cylinder sleeve between said piston head and said wall is expelled.

12. The pump according to claim 10, wherein said cylinder sleeve and at least a portion of an associated manifold are formed as a single integral component.

13. The pump according to claim 10, wherein said cylinder sleeve comprises a plastic material that is resistant to a temperature of at least 250° F.

14. The pump according to claim 10, wherein said piston rod comprises:

(a) a cap having an outer substantially planar surface forming a distal end of said piston head within the cylinder sleeve, said surface being generally perpendicular to said first direction, said cap also having a projection extending generally perpendicularly from a side opposite said planar surface and in a direction generally aligned with said first direction, the projection including a notch formed along its length;

(b) a tang formed in said piston rod so as to receive and engage said notch of said projection to lock said cap onto said piston rod; and (c) a seal, having an aperture defined therein through which said projection passes, said seal being held in compression between said cap and said piston rod.

15. The pump according to claim 14, wherein said cap is generally cylindrical in shape, having an annular wall opposite said planar surface that defines an open end through which the projection extends, and an annular lip extending radially around an outer periphery of said planar surface.

16. The piston according to claim 14, wherein said seal defines an annular groove, axially engaging said annular wall of said cap, and surrounding an outside perimeter of said annular wall, except for said annular lip and said planar surface.

17. The piston according to claim 10, wherein said piston rod comprises a plastic material.

18. The pump according to claim 10, wherein said piston rod includes a middle portion having a bearing slot that extends transversely to a longitudinal axis of the piston rod, and wherein said pump means further include a crankwheel rotatably mounted in said interior of said housing, said crankwheel including a crank pin disposed adjacent to an outer perimeter of said crankwheel, said crankpin extending from said crankwheel into said bearing slot, such that rotation of said crankwheel causes said crankpin to move within said bearing slot applying a force to sides of the bearing slot that translates into a linear reciprocation of said piston rod in said housing.

19. The pump according to claim 10, wherein said pump means further comprise:
(a) first means for admitting air from a region surrounding said housing into said at least one cylinder sleeve during each intake stroke of said piston head;
(b) second means for conveying air that is compressed during each compression stroke of said piston head from said at least one cylinder sleeve;
(c) at least one manifold positioned in said housing for receiving said compressed air conveyed from said at least one cylinder sleeve; and
(d) a conduit for supplying said compressed air from said manifold to an article to be inflated.

20. The pump according to claim 19, wherein said cylinder sleeve has a first end and a second end, said manifold comprising:
(a) a cylinder head disposed at said first end of said cylinder sleeve, and
(b) a one-way valve formed within said cylinder sleeve intermediate said piston head and said cylinder head, said one-way valve permitting air compressed during the compression stroke to flow out of said cylinder sleeve, but substantially preventing air from flowing into said cylinder sleeve during the intake stroke.

21. The pump according to claim 20, said manifold further comprising a cap wherein said cylinder head is integrally formed with said cylinder sleeve, and said cap is ultrasonically welded to said cylinder head.

22. The pump assembly according to claim 20, wherein said one-way valve further comprises:
(a) a wall within said cylinder sleeve, dividing said cylinder sleeve into a first region adjacent the piston, and second region within said manifold;
(b) a passage defined through said wall, providing fluid communication between said first and said second regions; and
(c) an elastomeric material, substantially covering said passage in said second region, wherein said elastomeric material flexes in a first direction, opening a path of fluid communication through said passage during said compression stroke of said piston head, but flexes in a second direction during said intake stroke of said piston head, substantially sealing said passage.

23. The pump assembly according to claim 22, wherein said passage comprises:
(a) a first portion, said first portion being in fluid communication with said first region, and
(b) a second portion, said second portion being in fluid communication with said second region, and having a cross-sectional area significantly greater than the cross-sectional area of said first portion, wherein said compressed air flowing through said passage, from said first portion into said second portion, expands and is cooled.

24. The pump according to claim 19, wherein said first means for admitting air from a region surrounding said housing into said at least one cylinder sleeve comprises an intake port that is defined by a skirt of said cylinder sleeve, said skirt having a significantly larger diameter than a main body portion of said cylinder sleeve, so that when a top surface of said piston head is within said skirt, a gap exists around an outer periphery of said top surface of said piston head and an inner periphery of said skirt through which air is drawn into said cylinder sleeve.

25. The pump according to claim 8, wherein said clamp assembly includes:
(a) a first member attached to said housing proximate to said sprocket, said first member being designed to engage one side of the first tube;
(b) a second member mounted to said housing so as to be movable between (i) a first position where said first and second members are spaced a distance greater than a cross-sectional thickness of the first tube; and (ii) a second position wherein said first member engages one side of the first tube, and said second member engages an opposite side of the first tube in compression, with an engagement force sufficient to secure said housing to the first tube; and
(c) means, coupled to a said second member, for (i) causing said second member to move between said first and second positions, and (ii) urging said second member against said opposite side of the first tube with a force equal to said engagement force when said second member has been moved to said second position.

26. The pump according to claim 8, further comprising indicator means for indicating a pressure of said compressed air provided by said pump means.

27. The pump according to claim 8, wherein said pump means provide compressed air, regardless of the direction of rotation of said sprocket.

28. The pump according to claim 8, wherein said clamp means comprise:
(a) a jaw mounted to an exterior of said housing,
(b) a mandible, mounted to an exterior of said housing, positioned facing said jaw;
(c) a knob, rotatably mounted to said housing, said knob being rotatable in a first direction and in a second direction to rotatably drive a threaded rod coupled to the mandible, wherein said mandible linearly translates towards said jaw in response to rotating said knob in said first direction, and linearly translates away from said jaw in response to rotating said knob in said second direction due to rotation of the threaded rod within a mating nut that is captive in the mandible.

29. The pump according to claim 26, wherein said knob comprises a plurality of flattened regions adapted to engage a tool for increasing a rotative torque that may be applied to said knob.

30. The pump according to claim 8, wherein said pump means further include:
(a) first and second cylinder sleeves positioned in said interior of said housing in an opposed relationship; and
(b) a double-ended piston rod having a first piston head positioned in said first cylinder sleeve and a second piston head positioned in said second cylinder sleeve, said piston rod being reciprocally mounted in said housing so that (i) when said piston rod is driven in a first direction, said first piston head advances into the first cylinder sleeve in a compression stroke and said second piston head withdraws within the second cylinder sleeve in an intake stroke, and (ii) when said piston rod is driven in a second direction, said first piston head withdraws within said first cylinder sleeve in an intake stroke, and said second piston head advances into said second cylinder sleeve in a compression stroke, air in said first and second cylinder sleeves being compressed during respective compression strokes of said first and second piston heads, further wherein said piston rod includes a middle portion having a bearing slot extending transversely to the longitudinal axis of the piston rod.

31. The pump according to claim 30, further comprising:
(a) a first manifold mounted to said first cylinder sleeve for receiving compressed air conveyed from said first cylinder sleeve;
(b) a second manifold mounted to said second cylinder sleeve for receiving compressed air conveyed from said second cylinder sleeve; and
(c) an equalizer tube having a first end attached to said first manifold and a second end attached to said second manifold so as to permit said compressed air to flow from said first manifold to said second manifold.

32. The device for pumping air according to claim 8, wherein said pump means comprise:
(a) at least one cylinder having a cylinder sleeve and at least part of a manifold that are formed as a single integral component, wherein the cylinder sleeve has a first end and second end, the manifold being disposed at the first end of the cylinder sleeve;
(b) at least one piston slidably inserted within the second end of the cylinder sleeve, having a central axis generally coincident with a central axis of the cylinder; and
(c) a one-way valve disposed in said manifold, including a passage sealed by an elastomeric material, wherein said elastomeric material flexes in a first direction during a compression stroke of said piston, opening said passage such that there is a path of fluid communication between the manifold and an interior portion of said at least one cylinder, but flexes in a second direction during an intake stroke of said piston, substantially sealing said passage.

* * * * *